| (12) | United States Patent | (10) Patent No.: | US 9,932,724 B2 |
|---|---|---|---|
| | Chan | (45) Date of Patent: | Apr. 3, 2018 |

(54) FLUID CONTROL DEVICE

(71) Applicant: Olympic Leader Limited, Kowloon (HK)

(72) Inventor: Sai Fai Chan, Kowloon (HK)

(73) Assignee: OLYMPIC LEADER LIMITED, Taim Sha Tsui, Kowloon (HK)

( * ) Notice: Subject to any disclaimer, the term of this patent is extended or adjusted under 35 U.S.C. 154(b) by 52 days.

(21) Appl. No.: 15/121,378

(22) PCT Filed: Feb. 26, 2015

(86) PCT No.: PCT/CN2015/073308
§ 371 (c)(1),
(2) Date: Aug. 24, 2016

(87) PCT Pub. No.: WO2015/127895
PCT Pub. Date: Sep. 3, 2015

(65) Prior Publication Data
US 2016/0376774 A1    Dec. 29, 2016

(30) Foreign Application Priority Data

Feb. 16, 2014    (HK) .................. 14101859.2

(51) Int. Cl.
*E03C 1/02*    (2006.01)
*F16K 11/20*    (2006.01)
(Continued)

(52) U.S. Cl.
CPC .............. *E03C 1/02* (2013.01); *F16K 11/074* (2013.01); *F16K 11/207* (2013.01);
(Continued)

(58) Field of Classification Search
CPC .. E03C 1/02; E03C 2001/005; E03C 2201/30; E03C 2201/40; F16K 11/074;
(Continued)

(56) References Cited

U.S. PATENT DOCUMENTS 4,188,974 A * 2/1980 Roger ................... F16K 11/065
                                                                137/557
5,057,214 A * 10/1991 Morris ................. B01D 29/668
                                                                137/597

(Continued)

FOREIGN PATENT DOCUMENTS

CN    101225893 A    7/2008
CN    201215193 Y    4/2009
(Continued)

*Primary Examiner* — Matthew W Jellett
*Assistant Examiner* — Christopher Ballman
(74) *Attorney, Agent, or Firm* — Barlow, Josephs & Holmes, Ltd.

(57) ABSTRACT

A fluid control device includes a housing and a fluid temperature control assembly. The housing includes a first inlet, a second inlet for receiving a fluid, and a first outlet through which a fluid of a third temperature flows. The fluid temperature control assembly is in the housing, with apertures for regulating fluid communication between a mixing cavity and the first inlet of the housing, apertures communicating with the first outlet. The fluid temperature control assembly modifies properties of the apertures for regulating the amount of fluid having a first temperature relative to the amount of fluid having a second temperature with the mixing cavity, thereby maintaining the fluid discharged from the first outlet at a predetermined temperature.

13 Claims, 24 Drawing Sheets

(51) Int. Cl.
*F16K 11/00* (2006.01)
*F16K 11/074* (2006.01)
*F16K 31/00* (2006.01)
*F16K 49/00* (2006.01)
*F24D 17/00* (2006.01)
*E03C 1/00* (2006.01)

(52) U.S. Cl.
CPC .......... *F16K 19/006* (2013.01); *F16K 31/002* (2013.01); *F16K 49/005* (2013.01); *E03C 2001/005* (2013.01); *E03C 2201/30* (2013.01); *E03C 2201/40* (2013.01); *F24D 17/0005* (2013.01); *F24D 17/0026* (2013.01); *F24D 17/0036* (2013.01); *F24D 17/0078* (2013.01); *F24D 17/0089* (2013.01); *Y10T 137/87249* (2015.04); *Y10T 137/87877* (2015.04)

(58) Field of Classification Search
CPC .. F16K 11/207; F16K 19/006; F24D 17/0005; F24D 17/0026; F24D 17/0036; F24D 17/0078; F24D 17/0089; Y10T 137/87249; Y10T 137/87877
USPC ......................................... 137/337, 339, 340
See application file for complete search history.

(56) References Cited

U.S. PATENT DOCUMENTS

| | | | | |
|---|---|---|---|---|
| 6,029,699 | A * | 2/2000 | Granot | E03C 1/04 137/565.12 |
| 8,162,236 | B2 * | 4/2012 | Rodenbeck | E03C 1/057 239/390 |
| 2006/0266424 | A1 * | 11/2006 | Filtness | E03C 1/0403 137/625.4 |
| 2007/0235091 | A1 * | 10/2007 | Granot | E03C 1/0404 137/597 |
| 2010/0287695 | A1 * | 11/2010 | Houghton | F16K 11/074 4/623 |
| 2011/0024513 | A1 * | 2/2011 | Davidson | F16K 11/044 236/12.1 |

FOREIGN PATENT DOCUMENTS

| | | |
|---|---|---|
| CN | 201306472 Y | 9/2009 |
| CN | 201934722 U | 8/2011 |
| DE | 2330009 A1 | 1/1975 |
| DE | 2712707 A1 | 9/1978 |
| DE | 102010053442 A1 | 6/2012 |

* cited by examiner

FLUID CONTROL DEVICE

BACKGROUND OF THE INVENTION

Field of Invention

The present invention relates to a fluid control device, and in particular to a fluid control device with a temperature control function and energy recovery system. Specifically, the present invention relates to a valve assembly with a thermostatic function and a heat energy recovery device including the valve assembly.

Related Art

In everyday life, people may use different washing facilities for cleaning and washing. These washing facilities include, for example, bathrooms, washing sinks, hair washing sinks, and the like. However, if the washing facilities use hot water as a washing medium, wastewater discharged by the facilities still contains a huge amount of heat energy, resulting in a waste of energy. Therefore, people try to recover and utilize heat energy from the discharged wastewater.

An invention patent CN201010224654.4 filed on Jul. 7, 2010 and entitled "valve assembly and heat energy recovery device with the valve assembly" discloses a valve assembly. As shown in FIG. 1, the valve assembly 2 includes a housing 30, a spool 31 disposed in the housing 30 and a handle 32 for controlling the spool. The housing 30 is provided with a cold water input pipe 24, a cold water output pipe 25, a tepid water input pipe 26, a hot water output pipe 27, and a hot water input pipe 29, so as to be in communication with the spool 31. The heat energy recovery device disclosed in the patent can be directly installed without transforming or changing a building structure, thereby simplifying the installation procedure and reducing the installation cost. Moreover, as shown in FIG. 2, in the heat energy recovery device, a cold water source is not directly communicated with a heat exchange device, but is communicated with the valve assembly and provides cold water for the heat exchange device by means of the valve assembly. The cold water is heated into tepid water by the heat exchange device, and the tepid water is returned to the valve assembly to be mixed with hot water supplied by a hot water source, to generate tepid water at a suitable temperature, and the tepid water is input, by means of the valve assembly, into a washing facility to be utilized. Therefore, water pressure borne by the heat exchange device can be effectively reduced, to prevent seepage of clean water caused by damage to the heat exchange device. However, in the heat energy recovery device, because the cold water enters the valve assembly after heat exchange is performed in a heat exchanger, and the temperature of the cold water rises slowly to achieve stability, in the meantime, a user needs to regulate a handle of the valve assembly constantly to stabilize the water temperature, which is inconvenient.

SUMMARY OF THE INVENTION

In view of the foregoing problems in the prior art, one objective of the present invention is to provide a fluid control device for stabilizing the temperature of fluid output, such that to output a fluid with desirable temperature. In one of the embodiments, the fluid control device may implement as a valve assembly with a thermostatic function.

According to a first aspect of the present invention, there is provided a fluid control device, comprising: a housing including a first inlet for receiving a fluid having a first temperature, a second inlet for receiving a fluid having a second temperature, and first outlet through which a fluid of a third temperature flows; a fluid temperature control assembly disposed in the housing, and including a mixing cavity defined therein, wherein the fluid temperature control assembly comprises: a first group of one or more apertures of the mixing cavity configured for regulating fluid communication between the mixing cavity and the first inlet of the housing; a second group of one or more apertures of the mixing cavity for regulating fluid communication between the second inlet of the housing and the mixing cavity; a third group of one or more apertures of the mixing cavity in fluid communication with the first outlet; wherein the fluid temperature control assembly modifies properties of at least one or more of the first group of apertures or the second group of apertures for regulating the amount of fluid having a first temperature relative to the amount of fluid having a second temperature received within the mixing cavity, thereby maintaining the fluid discharged from the first outlet at a predetermined temperature.

The fluid temperature control assembly may further comprises: a sensor for detecting the temperature of the mixed fluid within the mixing cavity and modifying the at least one or more of the first group of apertures or one or more of the second group of apertures of the fluid temperature control assembly according to the detected temperature of the mixed fluid within the mixing cavity.

The fluid control device may further includes a third inlet and a third outlet for receiving and discharging fluid of a fourth temperature, wherein the fluid of a fourth temperature may be thermally isolated from the fluid within the fluid control device other than the fluid of a third temperature.

The fluid control device may further includes a flow regulating valve disposed within the housing, the flow regulating valve comprising: a first plate having a first hole and a second hole therethrough, the first and second holes being spaced apart from each other, a second plate moveable relative to the first plate and including a first slot formed therein, wherein changing the alignment of the first slot of the second plate relative to the holes of the first plate may regulates the amount of fluid flow through a passageway from the third inlet to the third outlet.

The first plate may further includes at least a further hole in fluid communication with the first inlet and a fourth hole in fluid communication with first group of one or more apertures of the fluid temperature control assembly; the second plate may further includes a second slot, wherein by changing the alignment of the first and second slots of the second plate relative to the holes of the first plate may control the fluid communication between the third inlet and the third outlet and the fluid communication between the first inlet and the first group of one or more apertures of the fluid temperature control assembly.

The flow regulating valve may further includes a third plate, arranged such that the second plate may be disposed between the first plate and the third plate, wherein each of the first plate, second plate and third plate further includes at least a further hole therein, and said at least one further hole of the third plate and the fluid temperature control assembly being in fluid communication; and the second plate may be configured such that movement of the second plate relative to the first and third plates and the first slot and at least one further hole therein simultaneously regulates flow between the third inlet and the third outlet and flow between the first inlet and fluid temperature control assembly.

The fluid control device may further includes: a flow regulating knob disposed on the housing for adjusting via a connecting rod the flow regulating valve so as to modify the alignment of the second plate relative to the holes of the other plates; a temperature regulating knob disposed on the housing, for regulating the predetermined temperature of the mixed fluid within the mixing cavity by adjusting the regulating knob or connecting rod thereof; wherein the flow regulating knob or the connecting rod thereof may be axially coincident.

The fluid control device may further includes: a flow regulating knob disposed on the housing for adjusting via a connecting rod a flow regulating valve so as to modify the alignment of the second plate relative to the holes of the other plates; wherein the connector of the second plate and the flow regulating knob may extend through the interior of the fluid temperature control assembly.

The third group of one of more apertures of the mixing cavity of the fluid temperature control assembly may be connected to the first outlet of the housing via one of the first plate or the second plate or the third plate.

The second inlet of the housing may be connected to the second group of one or more apertures of the fluid temperature control assembly through at least one of the first plate, second plate or third plate.

The fluid control device may further includes: a heat exchanger thermally isolated from the housing; a fluid passageway for conveying fluid with a fourth temperature from the third outlet of the housing to the heat exchanger; wherein the fluid of fourth temperature may undergoes heat exchange with the mixed fluid with third temperature from the first outlet within the heat exchanger, such that the temperature of the fluid with fourth temperature may approach the second temperature, wherein at least a portion of the fluid with a second temperature after heat exchange may be conveyed via the second inlet.

The fluid control device may further includes a heater, wherein at least a portion of the fluid having a second temperature following heat exchange may be conveyed to the heater for heating to a first temperature and re-introduction into the first inlet.

Another objective of the present invention is to provide a heat energy recovery device including the aforementioned valve assembly with thermostatic function, where the heat energy recovery device can simplify the installation procedure and reduce the installation cost, effectively reduce water pressure borne by a heat exchange device, to prevent leakage of clean water, and can stably provide the temperature of hot water output.

According to the present invention, a valve assembly with a thermostatic function is provided, including: a housing with a cavity formed therein, the housing being provided with a cold water inlet, a cold water outlet, a hot water inlet, a tepid water inlet, and a tepid water outlet that are in communication with the cavity, where the cold water inlet is used for communicating with a cold water source, and the hot water inlet is used for communicating with a hot water source; a flow regulating knob; a flow regulating valve disposed in the cavity and connected with the flow regulating knob, used for communicating with the cold water inlet and the cold water outlet of the housing in different degrees; a water-temperature regulating knob; and a thermostat disposed in the cavity and connected with the water-temperature regulating knob, the thermostat having a tepid water inlet, a hot water inlet and a mixing chamber, where the tepid water inlet is in communication with the tepid water inlet of the housing to receive tepid water input externally, the hot water inlet is directly or indirectly in communication with the hot water inlet of the housing, the mixing chamber is in communication with the tepid water outlet of the housing to provide tepid water to the mixing chamber, and the thermostat can automatically regulate the amount of tepid water and hot water that enter the mixing chamber so as to stabilize the water temperature in the mixing chamber to be a temperature preset by the water-temperature regulating knob.

In the valve assembly, the flow regulating valve includes a first fixed plate and a moveable plate, where a cold water inlet aperture and a cold water outlet aperture are disposed as spaced apart on the fixed plate, and are in communication with the cold water inlet and the cold water outlet of the housing respectively, the moveable plate is relatively rotatably disposed on the fixed plate, and a surface of the fixed plate to which the moveable plate faces is provided with a first groove, where the groove is disposed to be capable of communicating with the cold water inlet and the cold water outlet in different degrees with rotation of the moveable plate so as to control cold water flow.

In the valve assembly, a contact surface between the fixed plate and the moveable plate is a plane.

In the valve assembly, the flow regulating knob and the water-temperature regulating knob are located on two ends of the housing separately.

In the valve assembly, a hot water inlet aperture and a hot water outlet aperture are further disposed as spaced apart on the first fixed plate, and are in communication with the hot water inlet of the housing and the hot water inlet of the thermostat respectively; and the surface of the fixed plate to which the moveable plate faces is further disposed with a second groove, where the first groove and the second groove are disposed to be capable of synchronously communicating the cold water inlet of the housing with the cold water outlet of the housing and communicating the hot water inlet of the housing with the hot water inlet of the thermostat simultaneously in different degrees with rotation of the moveable plate.

In the valve assembly, the flow regulating knob and the water-temperature regulating knob are located on two ends of the housing separately.

In the valve assembly, the flow regulating valve further includes a second fixed plate, where the first fixed plate is further provided with a hot water inlet aperture, and the second fixed plate is also provided with a hot water inlet aperture; the moveable plate is disposed between the first fixed plate and the second fixed plate, and is further provided with a hot water aperture; the hot water inlet aperture of the first fixed plate is in communication with the hot water inlet of the housing, and the hot water inlet aperture of the second fixed plate is in communication with the hot water inlet of the thermostat; and the groove and the hot water aperture of the moveable plate are disposed to be capable of synchronously communicating the cold water inlet of the housing with the cold water outlet of the housing and communicating the hot water inlet of the housing with the hot water inlet of the thermostat with different degrees depending on the rotation of the moveable plate.

In the valve assembly, a contact surface between the moveable plate and the first fixed plate or the second fixed plate is a plane.

In the valve assembly, the flow regulating knob and the water-temperature regulating knob are located on the same end of the housing.

In the valve assembly, the flow regulating knob or a connecting rod thereof and the water-temperature regulating knob or a connecting rod thereof are disposed to be capable of rotating coaxially.

In the valve assembly, the valve assembly further includes a connector connecting the moveable plate and the flow regulating knob, and passing through the interior of the thermostat.

In the valve assembly, the mixing chamber of the thermostat is communicated with the tepid water inlet of the housing through the first fixed plate, the second fixed plate, or the moveable plate.

In the valve assembly, the tepid water inlet of the housing is communicated with the tepid water outlet of the thermostat through the first fixed plate, the second fixed plate, or the moveable plate.

In the valve assembly, the fixed plate and the moveable plate are made of metal or ceramics.

According to another aspect, the present invention further provides a heat energy recovery device including the aforementioned valve assembly, which further includes a heat exchanger, the heat exchanger receiving hot wastewater from an application device and cold water output by the cold water outlet of the housing, to enable the hot wastewater to exchange heat with the cold water to heat the cold water into tepid water, where at least part of the tepid water is input into the valve assembly through the tepid water inlet of the housing so as to be mixed with external hot water inputted through the hot water inlet of the housing into lukewarm water and provided to the application device through the tepid water outlet.

The valve assembly with a thermostatic function and the heat energy recovery device including the aforementioned valve assembly with thermostatic function according to the present invention can be directly installed without transforming or changing a building structure, so as to simplify the installation procedure and reduce the installation cost, can effectively reduce water pressure borne by the heat exchange device, so as to effectively prevent leakage of clean water caused by damage to the heat exchange device, and can stably provide the temperature of hot water output.

BRIEF DESCRIPTION OF THE DRAWINGS

The basic structure of the device of the present invention is illustrated below with reference to the accompanying drawings, where.

DETAILED DESCRIPTION OF THE INVENTION

Various embodiments in which the valve assembly with a thermostatic function and the heat energy recovery device including the valve assembly according to the present invention are described below only by way of examples with reference to the accompanying drawings. It should be understood that the present invention is not limited thereto. Throughout accompanying drawings, same accompanying drawing reference signs are used for same components.

In the embodiments as mentioned below, the fluid control device with temperature control function are implemented as valve assembly with thermostat function. One would be appreciated that the fluid control device with temperature control function is not only limited to valve assembly, while temperature control function and temperature control device are not only limited to thermostat functions and thermostat devices. Any devices comprising fluid control functions and devices with temperature control function fall within the scope of the present invention.

Meanwhile, in the embodiments as mentioned below, the movable plate within the fluid control device are implemented as a rotatable plate for regulating the fluid communication flowing therein. It should be understood that such movable plate is not limited to rotatable plate where any devices comprising fluid flow regulating functions such as linear movable plate fall within the scope of the present invention.

Figure 8:
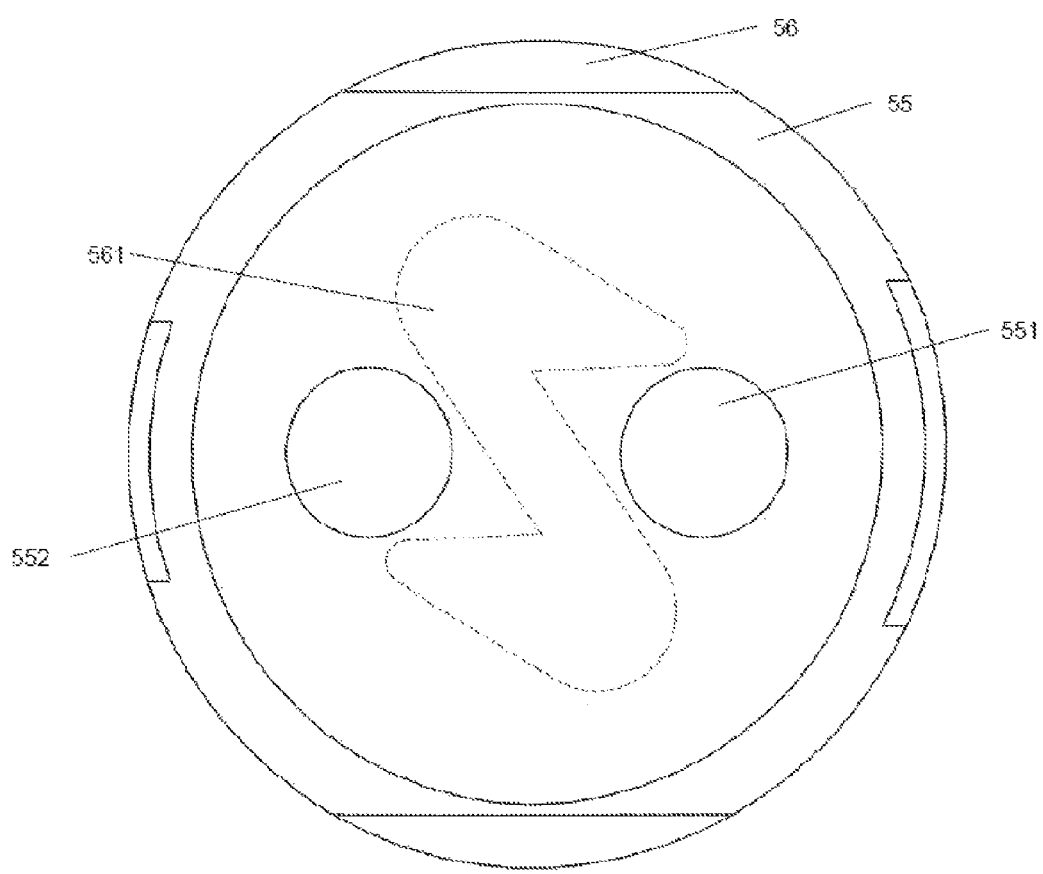
FIG. 8 is a schematic view of a state change of rotation of a moveable plate in the flow regulating valve shown in FIG. 7 relative to a fixed plate, illustrating that the flow regulating valve is in an off state.
Figure 9:
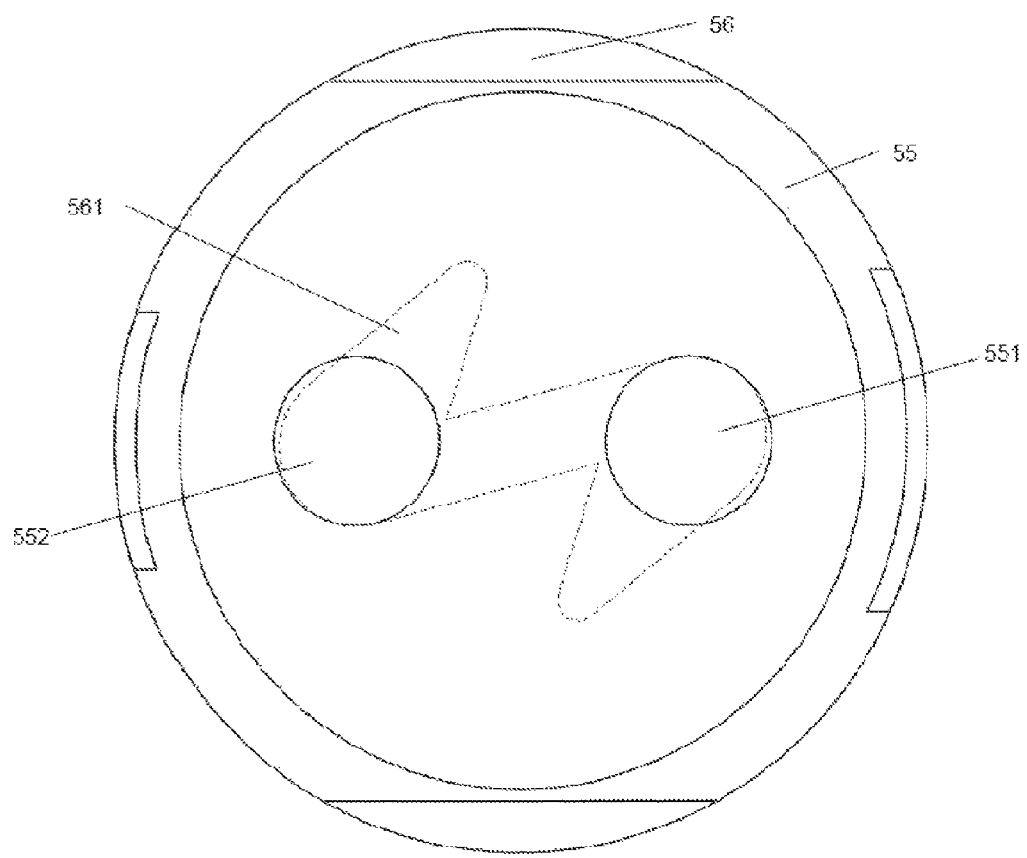
FIG. 9 is a schematic view of a state change of rotation of the moveable plate in the flow regulating valve shown in FIG. 7 relative to a fixed plate, illustrating that the flow regulating valve is in an on state.
Figure 10:
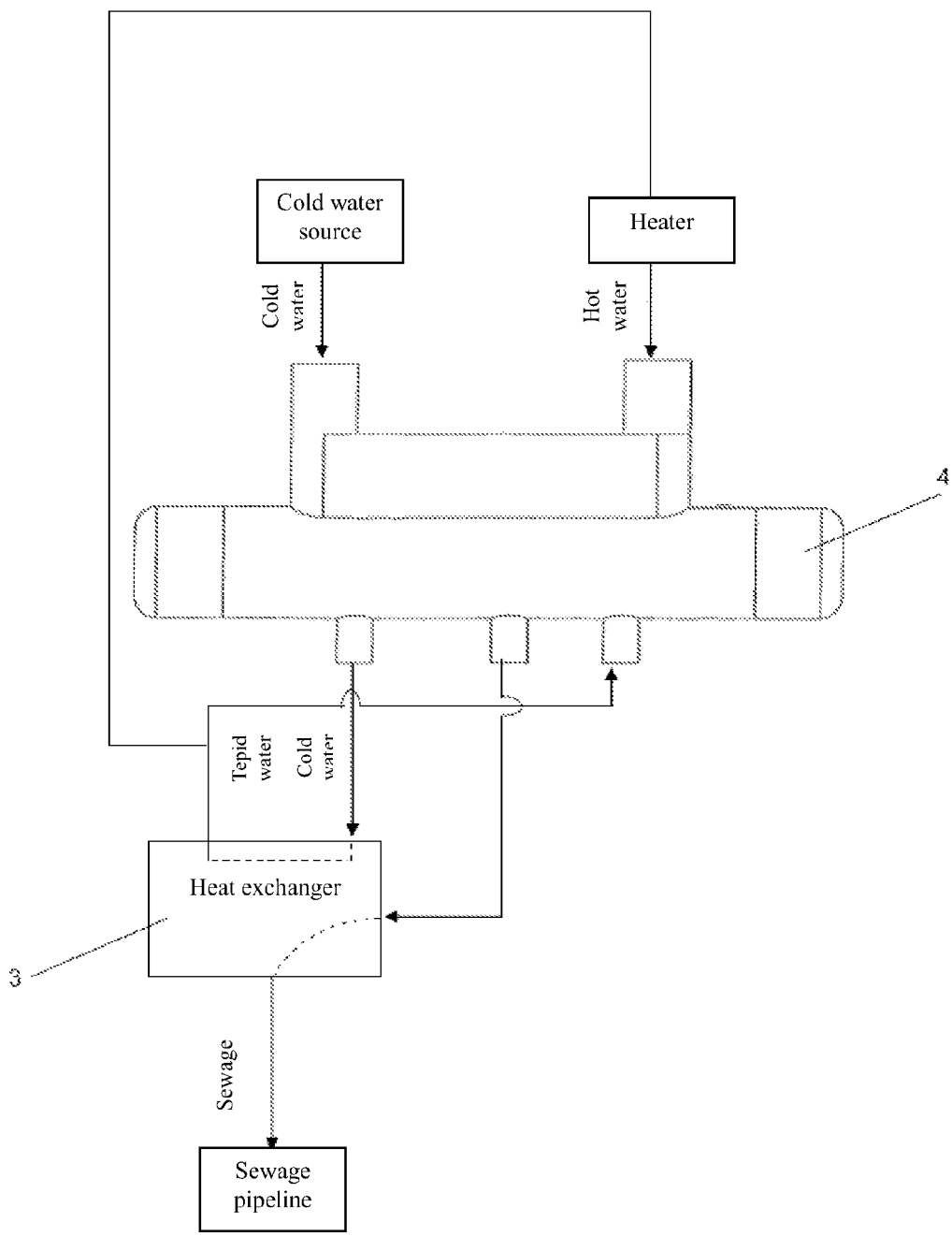
FIG. 10 is a structural block diagram of a heat energy recovery device including the said fluid control device with a temperature control function shown in FIG. 3.

FIG. 3 to FIG. 9 illustrate a structure of a first embodiment of a valve assembly with a thermostatic function according to the present invention, and FIG. 10 is a structural block diagram of a heat energy recovery device including the aforementioned valve assembly with thermostatic function according to the present invention.

Figure 1:
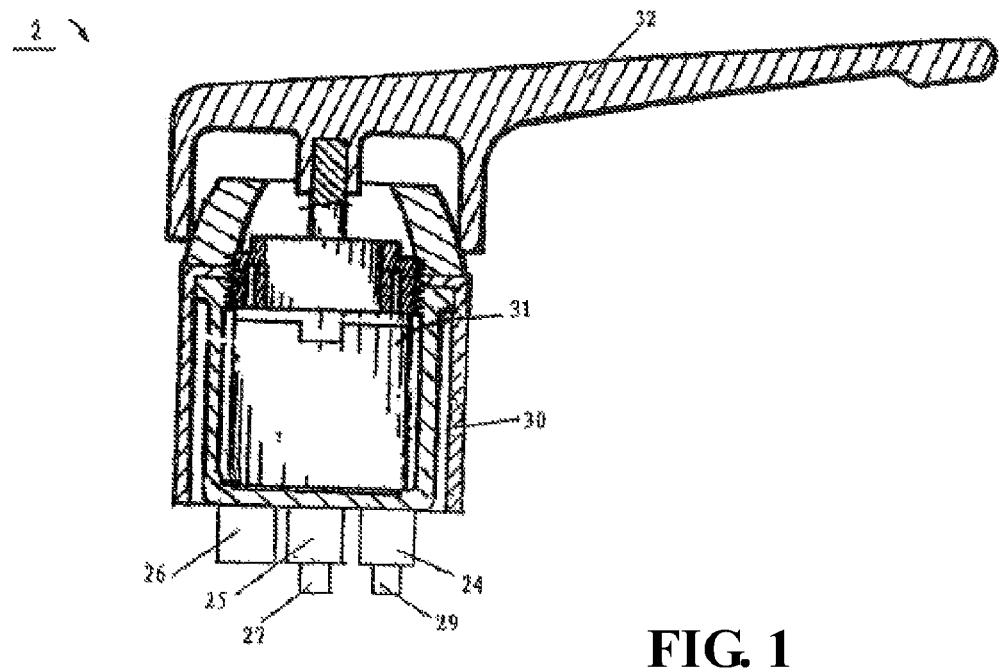
FIG. 1 is a schematic structural view of a valve assembly in the prior art.
Figure 2:
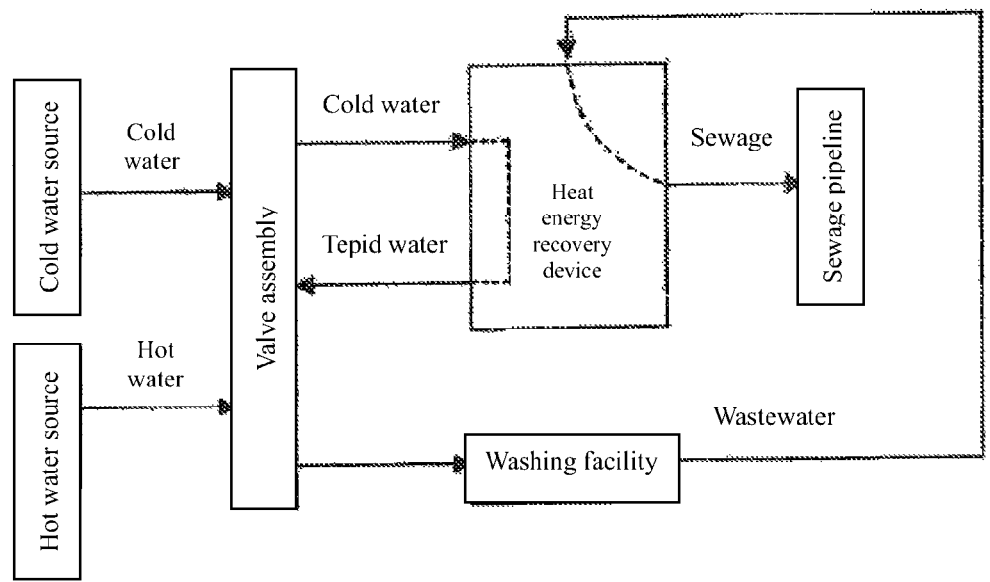
FIG. 2 is a structural block diagram of a heat energy recovery device in the prior art.
Figure 3:
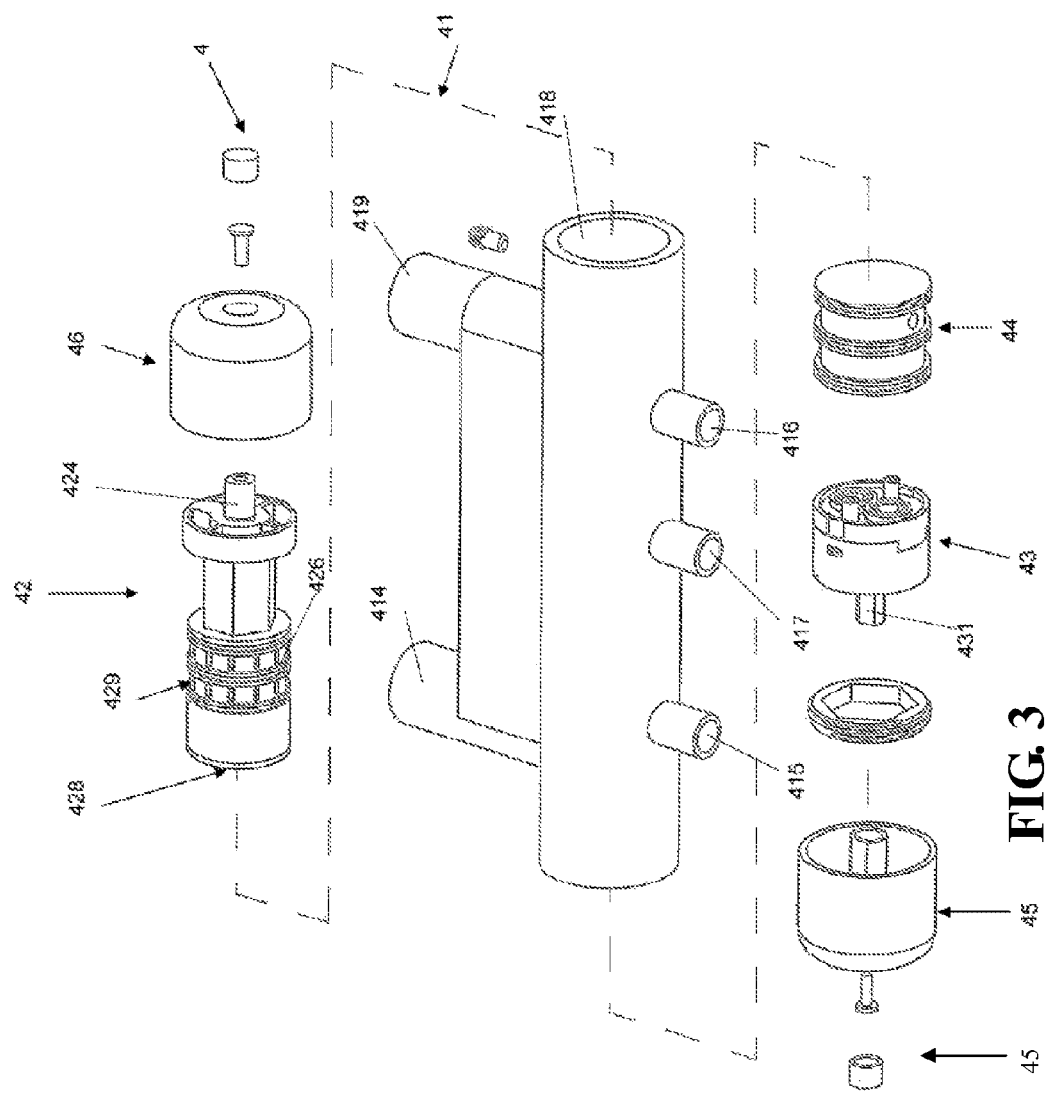
FIG. 3 is an exploded perspective view of a first embodiment of a fluid control device with a temperature control function according to the present invention.
Figure 4:
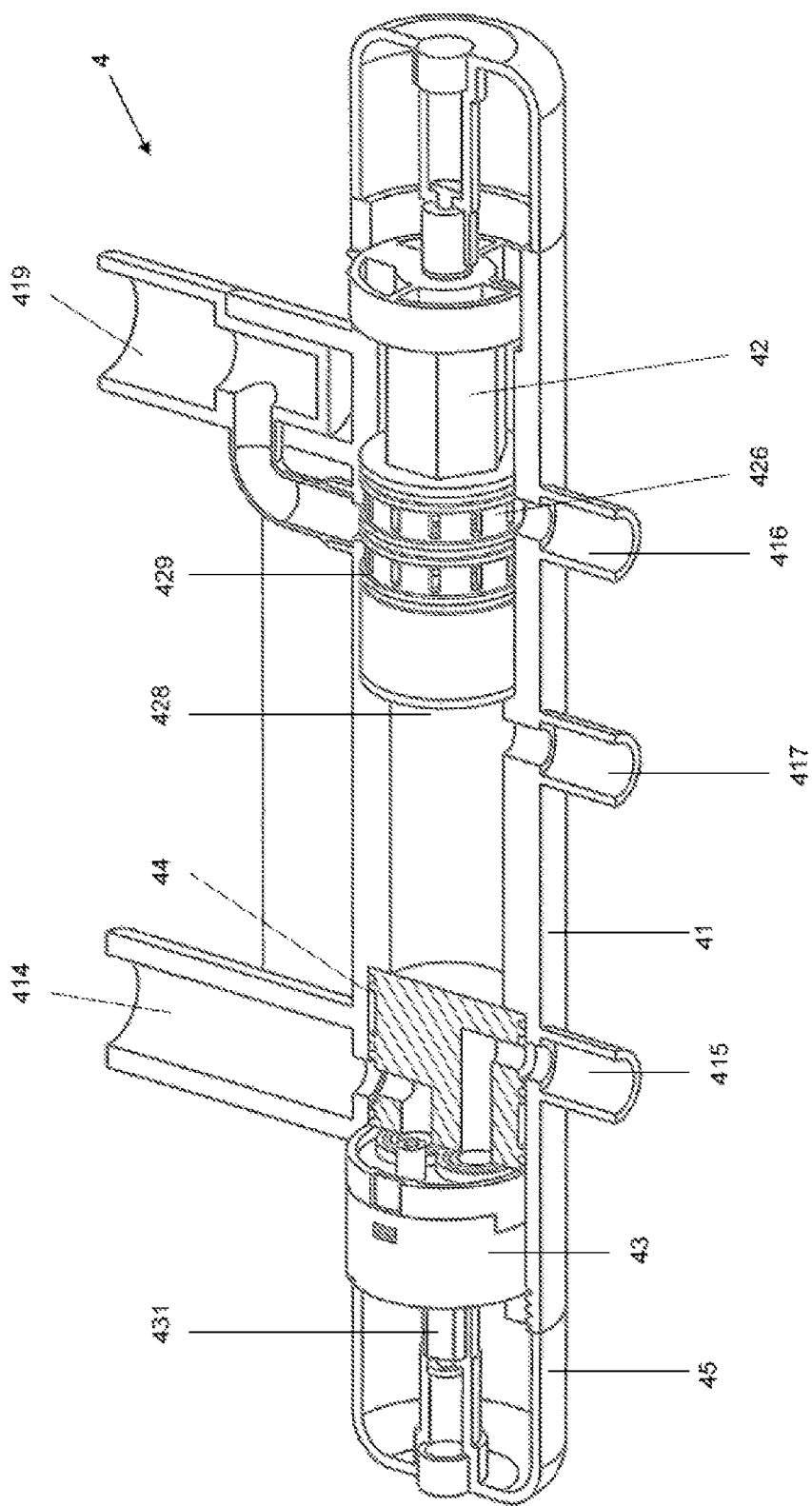
FIG. 4 is an assembling perspective view of the fluid control device shown in FIG. 3.

As shown in FIG. 3 and FIG. 4, the valve assembly 4 includes a housing 41, a flow regulating knob 45, a water-temperature regulating knob 46, a thermostat 42 disposed in the housing 41, a flow regulating valve 43, and a connector 44 that is in communication with the flow regulating valve 43 and the housing 41. The housing 41 is internally formed with a cavity 418, and is externally formed with a cold water inlet 414, a cold water outlet 415, a hot water inlet 419, a tepid water inlet 416, and a tepid water outlet 417 that are in communication with the cavity 418. In particular, the distance between the center of the cold water inlet 414 and hot water inlet 419 is approximately 150 mm, which is the same distance between the centers of the cold and water inlet of the cold hot water mixing valve utilized in the general bathroom in the market. Users only need to remove the existing mixing valve of the bathroom and replace with the valve assembly of the present invention without replacing the existing conduit of the building.

Figure 5:
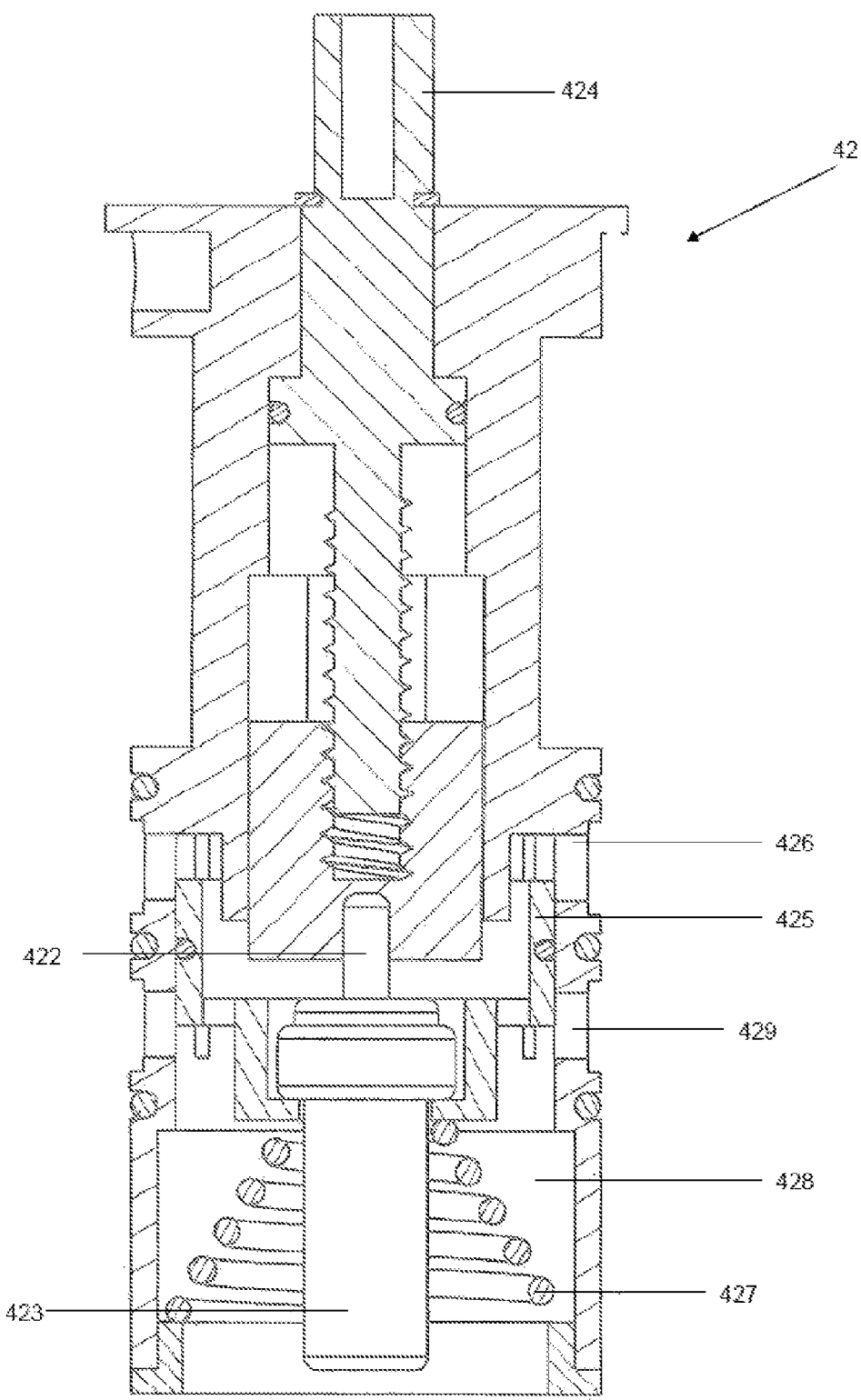
FIG. 5 is an assembling sectional view of a temperature control device in the fluid control device shown in FIG. 4.
Figure 6:
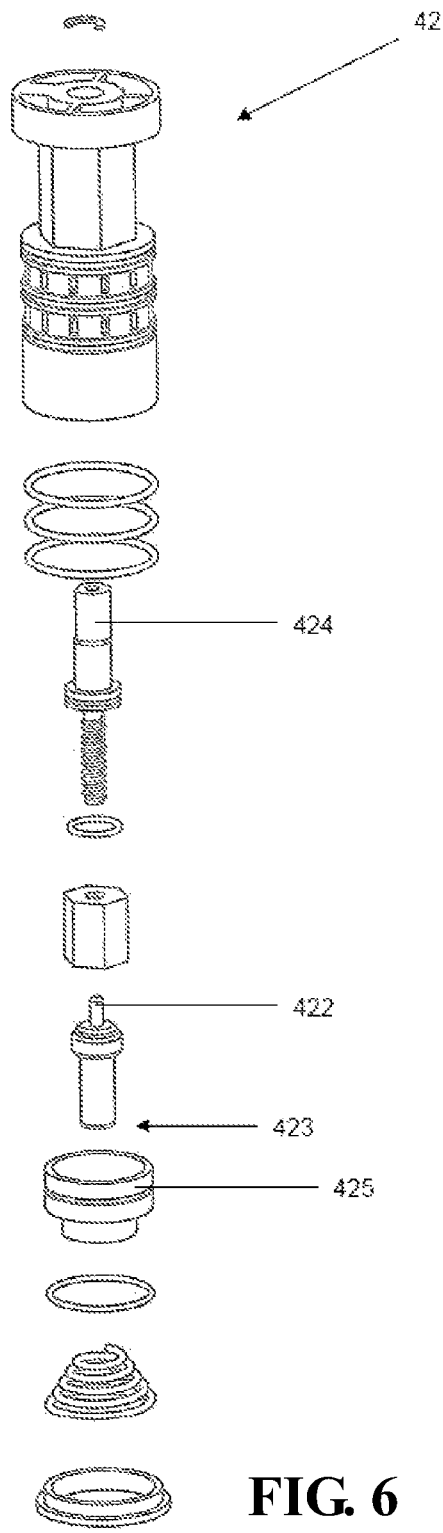
FIG. 6 is an exploded perspective view of the temperature control device shown in FIG. 5.

As shown in FIG. 5 and FIG. 6, the thermostat 42 has a hot water inlet 429 in communication with the hot water inlet 419 of the housing 41, a tepid water inlet 426 in communication with the tepid water inlet 416 of the housing 41, a mixing chamber 428 in communication with the tepid water outlet 417 of the housing 41, and a control rod 424 connected with the water-temperature regulating knob 46. The mixing chamber 428 of the thermostat 42 is provided with a thermostatic element 423 and a slider 425 therein. Substance in the thermostatic element 423 can automatically change the length of a tail 422 of the thermostatic element 423 based on the water temperature in the mixing chamber 428 through the principle of thermal expansion and contraction. When the water temperature in the mixing chamber 428 is higher than a temperature preset by the water-temperature regulating knob 46 by means of the control rod 424, the tail 422 of the thermostatic element 423 may lengthen to press the slider 425 downwards so as to reduce the degree of communication between the hot water inlet 429 and the mixing chamber 428 and increase the degree of communication between the tepid water inlet 426 and the mixing chamber 428, to increase the amount of tepid water in the mixing chamber 428 and decrease the amount of hot water, thereby lowering the water temperature in the mixing chamber 428. However, when the water temperature in the mixing chamber 428 is lower than the temperature preset by the water-temperature regulating knob 46 by means of the control rod 424, the tail 422 of the thermostatic element 423 may shorten, a spring 427 pushes the slider 425 upwards so as to increase the degree of communication between the hot water inlet 429 and the mixing chamber 428 and reduce the degree of communication between the tepid water inlet 426 and the mixing chamber 428, to increase the amount of hot water in the mixing chamber 428 and decrease the amount of tepid water, thereby raising the water temperature in the mixing chamber 428.

As shown in FIG. 3 and FIG. 4, the flow regulating valve 43 is disposed in the cavity 418 of the housing 41, and by means of a control rod 431 through which the flow regulating valve 43 is connected with the flow regulating knob 45, the flow regulating valve 43 can communicate with the cold water inlet 414 and the cold water outlet 415 of the housing 41 in different degrees to regulate water output of the cold water outlet 415.

Figure 7:
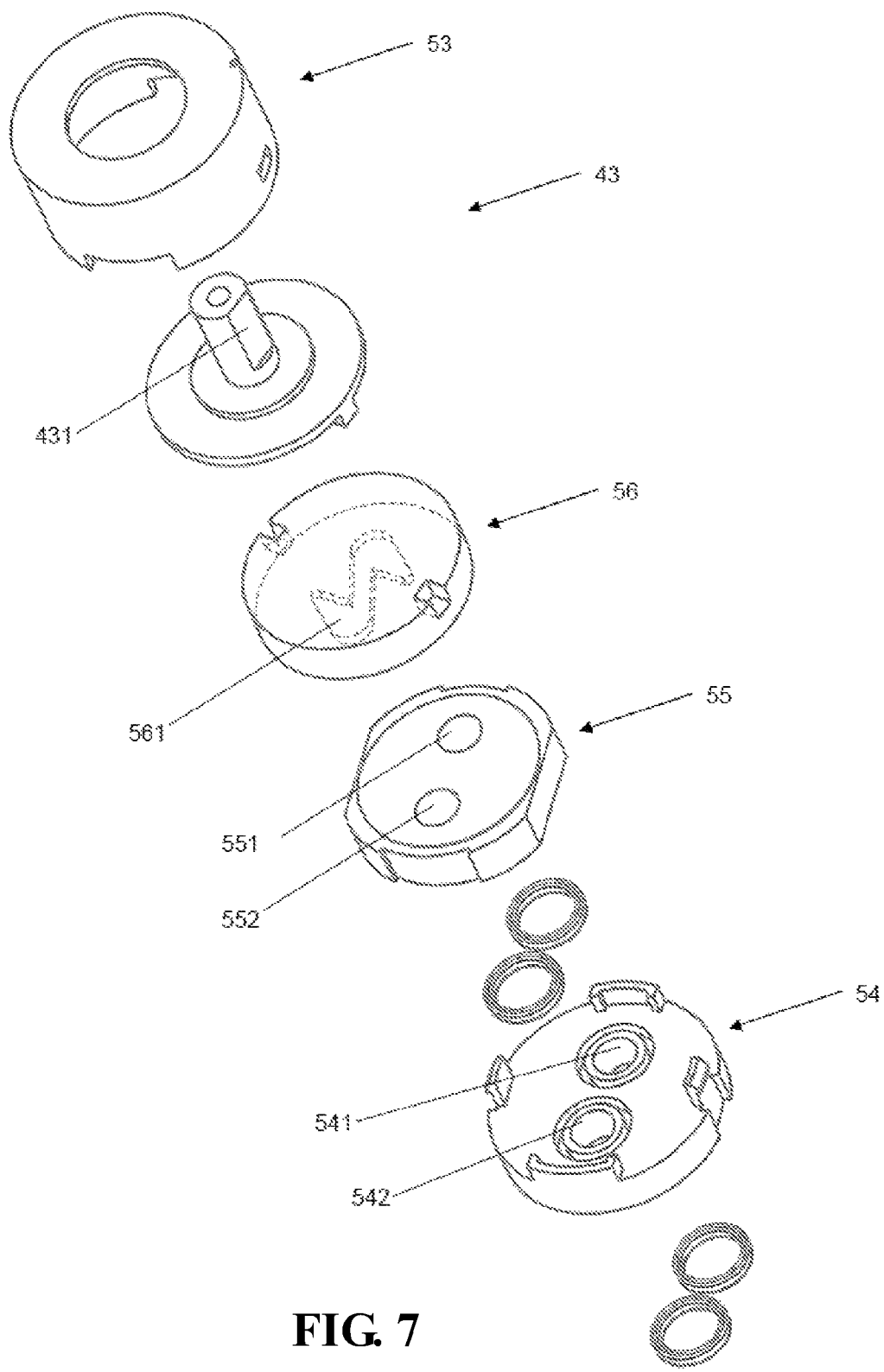
FIG. 7 is an exploded perspective view of a flow regulating valve in the fluid control device with a temperature control function shown in FIG. 4.

FIG. 7 is an exploded perspective view of the flow regulating valve 43. The flow regulating valve 43 includes a housing 53 with a cavity formed therein, a bottom cover 54 snapped to the housing 53 in a sealing manner, a fixed plate 55 fixedly disposed on the bottom cover 54 in the cavity of the housing 53, a rotatable plate 56 relatively rotatably disposed on the fixed plate 55, and a control rod 431 passing through the housing 53 and connecting to the rotatable plate 56, where the control rod 431 can drive the rotatable plate 56 to rotate on the fixed plate 55. The bottom cover 54 is provided with a cold water inlet 541 and a cold water outlet 542, which are in communication with the cold water inlet 414 and the cold water outlet 415 of the housing 41 respectively through the connector 44 (see FIG. 3 and FIG. 4). A cold water inlet hole 551 and a cold water outlet hole 552 are disposed as spaced apart on the fixed plate 55, and are in communication with the cold water inlet 541 and the cold water outlet 542 on the bottom cover 54 respectively. A surface (plane) of the fixed plate 55 to which the rotatable plate 56 faces is formed with a groove 561, which is disposed to selectively communicate with the cold water inlet 414 and the cold water outlet 415 with different degrees depending on the rotation of the rotatable plate 56 so as to control the amount of cold water of the cold water outlet 415 of the housing 41.

FIG. 8 and FIG. 9 illustrate state changes generated by rotation of the rotatable plate 56 relative to the fixed plate 55. In an initial state shown in FIG. 8, that is, when the flow regulating valve 43 is in an off state, the groove 561 does not cover the cold water inlet hole 551 or the cold water outlet hole 552, so that the cold water inlet hole 551 and the cold water outlet hole 552 are spaced apart from each other but are not in communication.

When the flow regulating knob 45 is used to rotate the control rod 431 to drive the rotatable plate 56 to rotate on the fixed plate 55, the flow regulating valve 43 enters a on state shown in FIG. 9. In this case, as shown in FIG. 10, cold water supplied by a cold water source enters the cold water outlet hole 552 through the cold water inlet hole 551 and the groove 561, that is, the cold water is output to the cold water outlet 415 of the housing 41 through the cold water inlet 414 of the housing 41 and further supplied to a heat exchanger 3. The cold water exchanges heat with hot water from an application device (for example, a washing facility) within the heat exchanger 3 to become tepid water, and part of the tepid water is directly communicated with the tepid water inlet 416 of the valve assembly 4 through a pipeline, part of the tepid water is communicated with a heater and is heated into a hot water source to be communicated with the hot water inlet 419 of the valve assembly 4, and provides hot water with a stable water temperature at the temperature preset by the temperature regulating knob 46 by means of the control rod 424 for the tepid water outlet 417 through the thermostat 42 so as to be supplied to the application device.

The fixed plate 55 and the rotatable plate 56 in the valve assembly of the present invention may be made of metal or ceramics.

FIG. 10 illustrates a structural block diagram of a heat energy recovery device including the said fluid control device according to the present invention. As shown in the figure, said heat energy recovery device comprises valve assembly 4 and heat exchanger. As shown in the figure, the water from the cold water source enters the heat exchanger through valve assembly 4. One skilled in the art would understand that water from the cold water may also enter heat exchange directly without passing through valve assembly 4. Upon passing through the heat exchanger to absorb the heat energy of waste water, the water reaches a higher temperature and becomes tepid water. Tepid water may enter valve assembly 4 through tepid water inlet and mix with the hot water entering valve assembly 4 from hot water inlet within the mixing cavity. For detailed description please refer to the aforementioned disclosure and it would not be reiterated here. It should be explained here that the hot water from the heat exchanger may also be heated to become hot water by a heater, and introduced into valve assembly through hot water inlet 419.

When valve assembly 4 is in off state, it separates the clean water within heat exchanger 3 and water heater from the cold water source of the building, such that heat exchanger 3 is not borne with any pressure from the cold water source under circumstances of no water usage, and even if there may exists any water leakage with heat exchanger 3, precious drinking water would not endlessly leak into waster water conduit and causes waste;

When valve assembly 4 is in on state, cold water enters heat exchanger 3 through valve assembly 4 upon entering cold water conduit, and further enters valve assembly 4 through hot water inlet 419 and warm water inlet 416 and finally out from warm water outlet 417. During water usage, the pressure of the cold water source is released through the warm water out from the warm water outlet 417. Thus, the conduit between the valve assembly 4 and the heat exchanger 3, the conduit between heat exchanger 3 and heater, the conduit between cold outlet 415 and heat exchanger, and the conduit between heat exchanger 3 and warm water inlet 416 would not subject to excessive pressure under on or off circumstances, and such that it may utilize soft plastic conduit instead of metal tube to reduce material and installation cost. Meanwhile, as heat exchanger 3 bears a lower water pressure, it may be made of thinner material to enhance heat exchange efficiency. FIG. 11 to FIG. 15 illustrate a structure of a second embodiment of a valve assembly with a thermostatic function according to the present invention, and FIG. 16 is a structural block diagram of a heat energy recovery device including the valve assembly with a thermostatic function according to the present invention. The structure of the valve assembly 6 with a thermostatic function in the second embodiment is roughly identical with that of the valve assembly 4 with a thermostatic function in the first embodiment, and the only different exist within the structures of a flow regulating valve 63. Detailed description about the same components is omitted herein.

Figure 11:
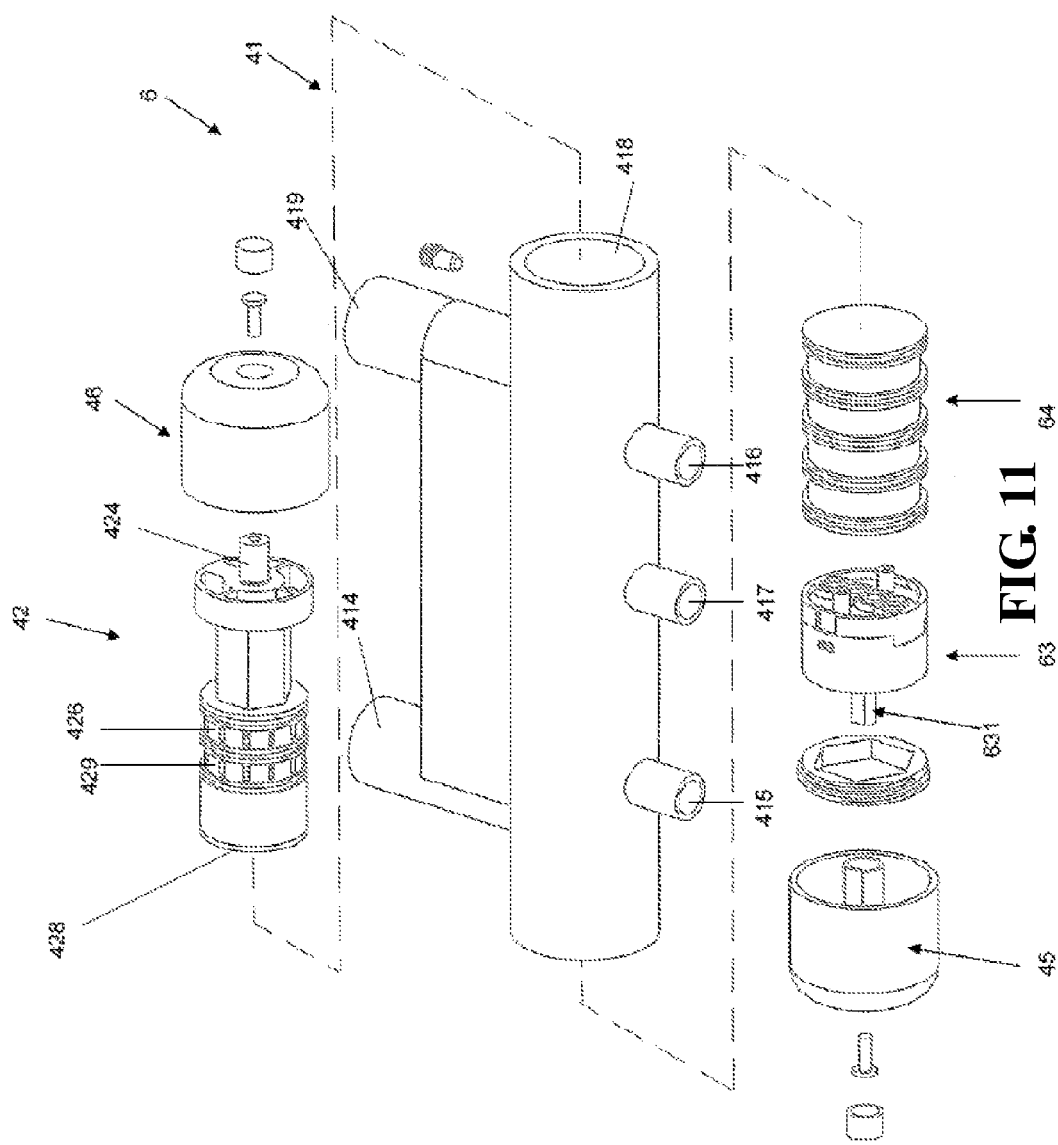
FIG. 11 is an exploded perspective view of a second embodiment of a fluid control device with a temperature control function according to the present invention.
Figure 12:
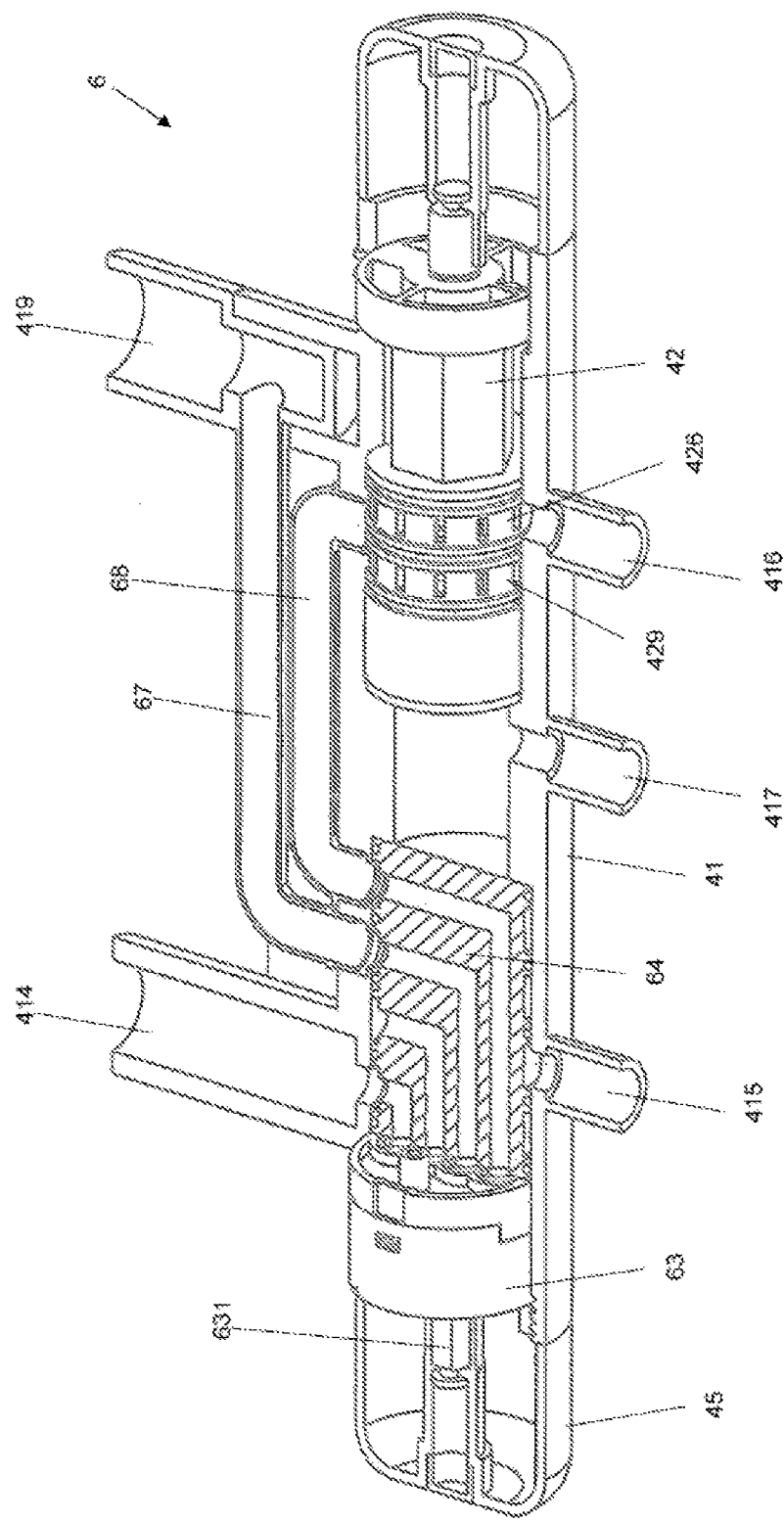
FIG. 12 is an assembling perspective view of the fluid control device shown in FIG. 11.

As shown in FIG. 11 and FIG. 12, the valve assembly 6 includes a housing 41, a flow regulating knob 45, a water-temperature regulating knob 46, a thermostat 42 disposed in the housing 41, a flow regulating valve 63, and a connector 64 and connecting pipes 67, 68 for communicating with the flow regulating valve 63 and the housing 41. The housing 41 is formed with a cavity 418 therein and is externally formed with a cold water inlet 414, a cold water outlet 415, a hot water inlet 419, a tepid water inlet 416, and a tepid water outlet 417 that are in communication with the cavity 418.

As shown in FIG. 11 and FIG. 12, the flow regulating valve 63 is disposed within the cavity 418 of the housing 41, and by means of a control rod 631 through which the flow regulating valve 63 is connected with the flow regulating knob 45, the flow regulating valve 63 can regulate water quantity.

Figure 13:
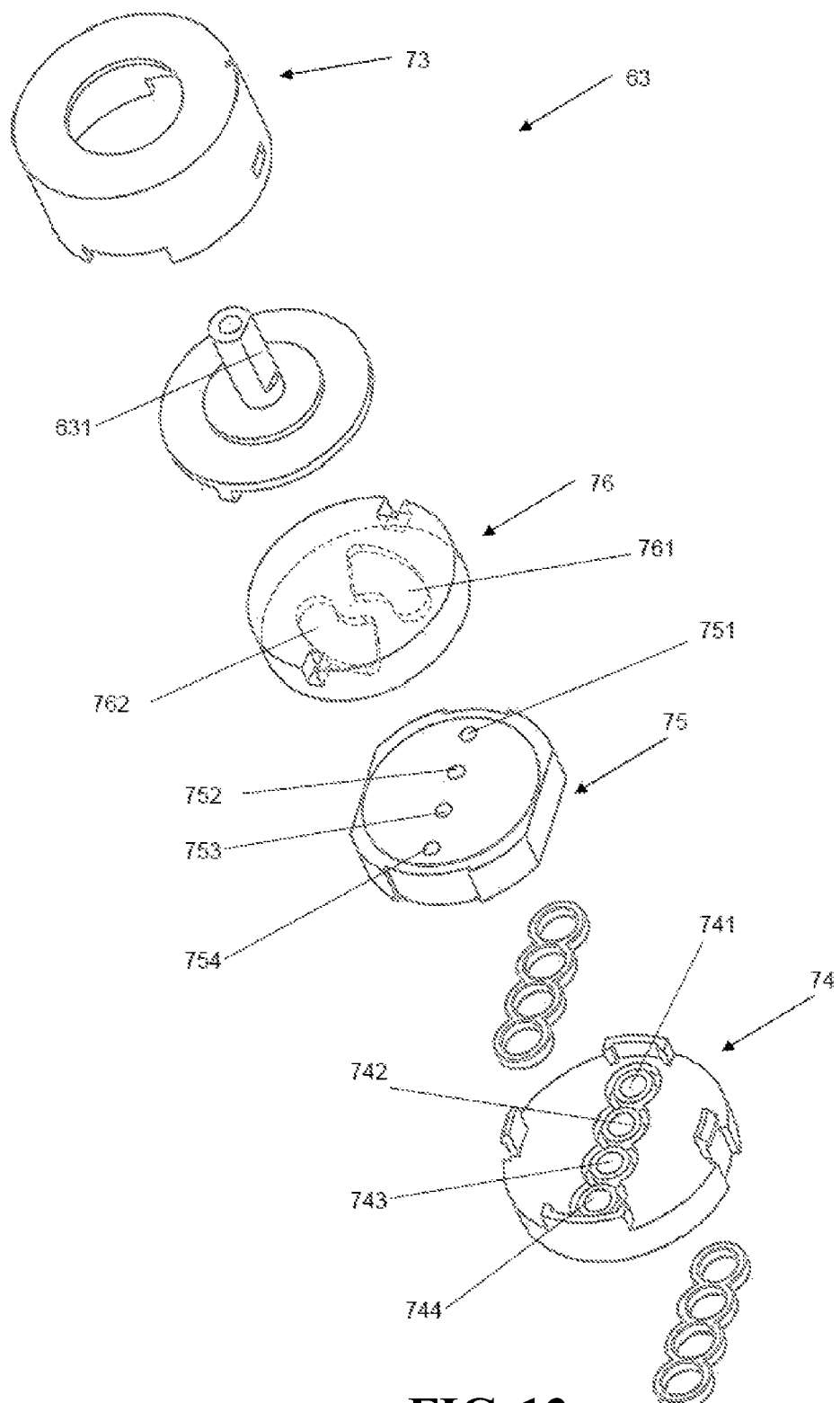
FIG. 13 is an exploded perspective view of a flow regulating valve in the fluid control device shown in FIG. 12.

FIG. 13 is an exploded perspective view of the flow regulating valve 63. The flow regulating valve 63 includes a housing 73 with a cavity formed therein, a bottom cover 74 snapped to the housing 73 in a sealing manner, a fixed plate 75 fixedly disposed on the bottom cover 74 in the cavity of the housing 73, a rotatable plate 76 relatively rotatably disposed on the fixed plate 75, and a control rod 631 passing through the housing 73 and connecting to the rotatable plate 76, where the control rod 631 can drive the rotatable plate 76 to rotate on the fixed plate 75. In addition to being provided with a cold water inlet 741 and a cold water outlet 742, the bottom cover 74 is further provided with a hot water inlet 743 and a hot water outlet 744, which, by means of the connector 64 and the connecting pipe 67 (see FIG. 12), such that the cold water inlet 741 communicate with the cold water inlet 414 of the housing 41, the cold water outlet 742 communicate with the cold water outlet 415 of the housing 41, the hot water inlet 743 communicate with the hot water inlet 419 of the housing 41, and the hot water outlet 744 communicate with the hot water inlet 429 of the thermostat 42.

In addition to a cold water inlet hole 751 and a cold water outlet hole 752 as provided in a spaced manner on the fixed plate 75, the fixed plate 75 is further provided with a hot water inlet hole 753 and a hot water outlet hole 754, which are in communication with the cold water inlet 741, the cold water outlet 742, the hot water inlet 743 and the hot water outlet 744 on the bottom cover 74 respectively.

A surface (plane) on the fixed plate 75 to which the rotatable plate 76 faces is formed with two grooves, a first groove 761 and a second groove 762, which are disposed to selectively synchronously communicate the cold water inlet 741 with the cold water outlet 742 and communicate the hot water inlet 743 with the hot water outlet 744 with different degrees depending on the rotation of the rotatable plate 76.

Figure 14:
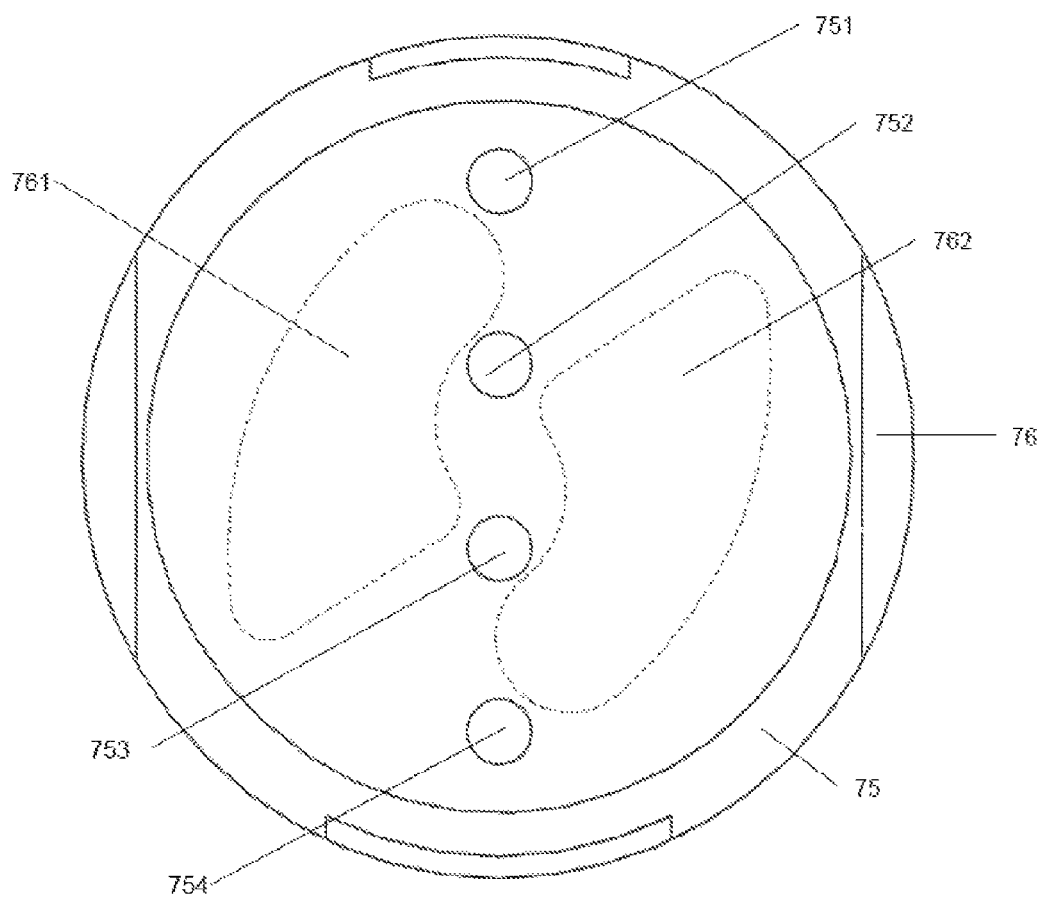
FIG. 14 is a schematic view of a state change of rotation of a moveable plate in the flow regulating valve shown in FIG. 13 relative to a fixed plate, illustrating that the flow regulating valve is in an off state.
Figure 15:
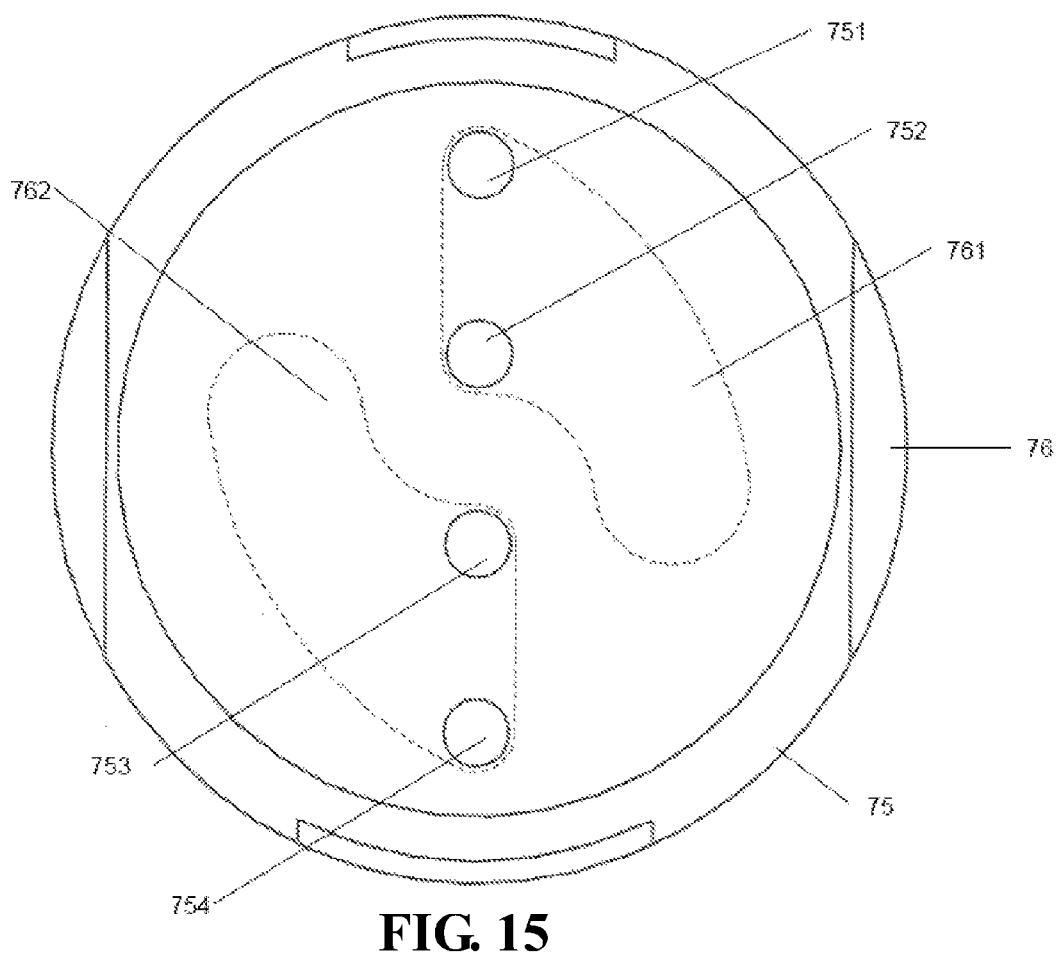
FIG. 15 is a schematic view of a state change of rotation of the moveable plate in the flow regulating valve shown in FIG. 13 relative to a fixed plate illustrating that the flow regulating valve is in an on state.
Figure 16:
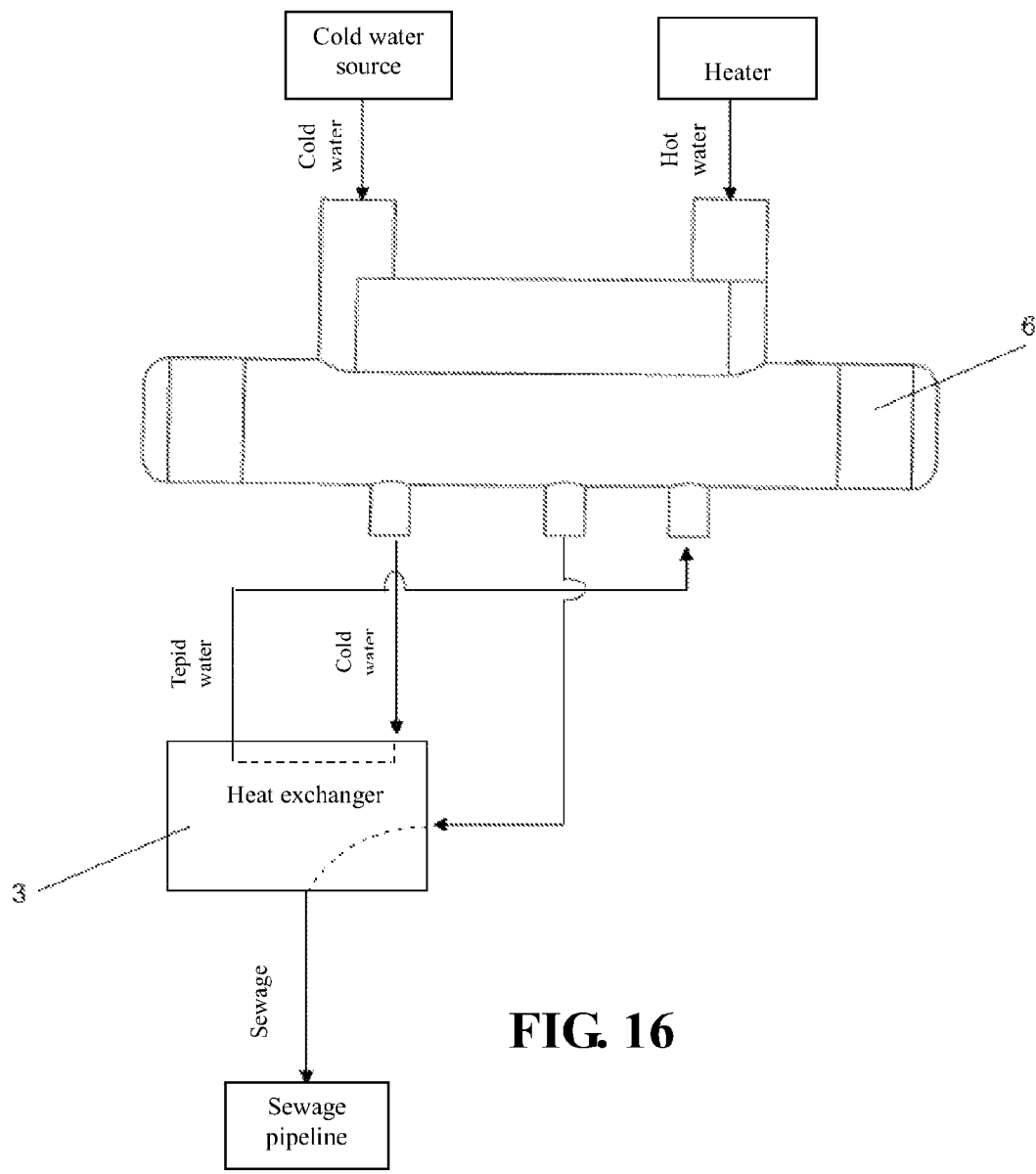
FIG. 16 is a structural block diagram of a heat energy recovery device including the fluid control device with a temperature control function shown in FIG. 11.

FIG. 14 and FIG. 15 illustrate state changes generated by rotation of the rotatable plate 76 relative to the fixed plate 75. In an initial state shown in FIG. 14, that is, when the flow regulating valve 63 is in an off state, the first groove 761 does not cover the cold water inlet hole 751 or the cold water outlet hole 752, and the second groove 762 does not cover the hot water inlet hole 753 and the hot water outlet hole 754, so that the cold water inlet hole 751 and the cold water outlet hole 752 are spaced apart from each other but are not in communication, and the hot water inlet hole 753 and the hot water outlet hole 754 are spaced apart from each other but are not in communication.

When the flow regulating knob 45 is used to rotate the control rod 631 to drive the rotatable plate 76 to rotate on the fixed plate 75, the flow regulating valve 63 gradually enters a full-on state shown in FIG. 15. In this case, as shown in FIG. 16, cold water supplied by a cold water source enters the cold water outlet hole 752 through the cold water inlet hole 751 and the first groove 761, that is, the cold water is output to the cold water outlet 415 of the housing 41 through the cold water inlet 414 of the housing 41 and to be further supplied to a heat exchanger 3. The cold water exchanges heat with hot water from an application device (for example, a washing facility) in the heat exchanger 3 to become tepid water, and is then communicated with the tepid water inlet 416 of the housing 41; meanwhile, hot water supplied by a hot water source enters the hot water outlet hole 754 through the hot water inlet hole 753 and the second groove 762, that is, the hot water is communicated with the hot water inlet 429 of the thermostat 42 through the hot water inlet 419 of the housing 41. The tepid water and the hot water, by means of the thermostat 42, provide hot water with a stable water temperature at the temperature preset by the temperature regulating knob 46 by means of the control rod 424 for the tepid water outlet 416, so as to be supplied to the application device.

FIG. 16 illustrates a structural block diagram of a heat energy recovery device including the fluid control device of a second embodiment according to the present invention. As FIG. 16 is substantially similar to FIG. 10, the description is omitted herein.

Figure 17:
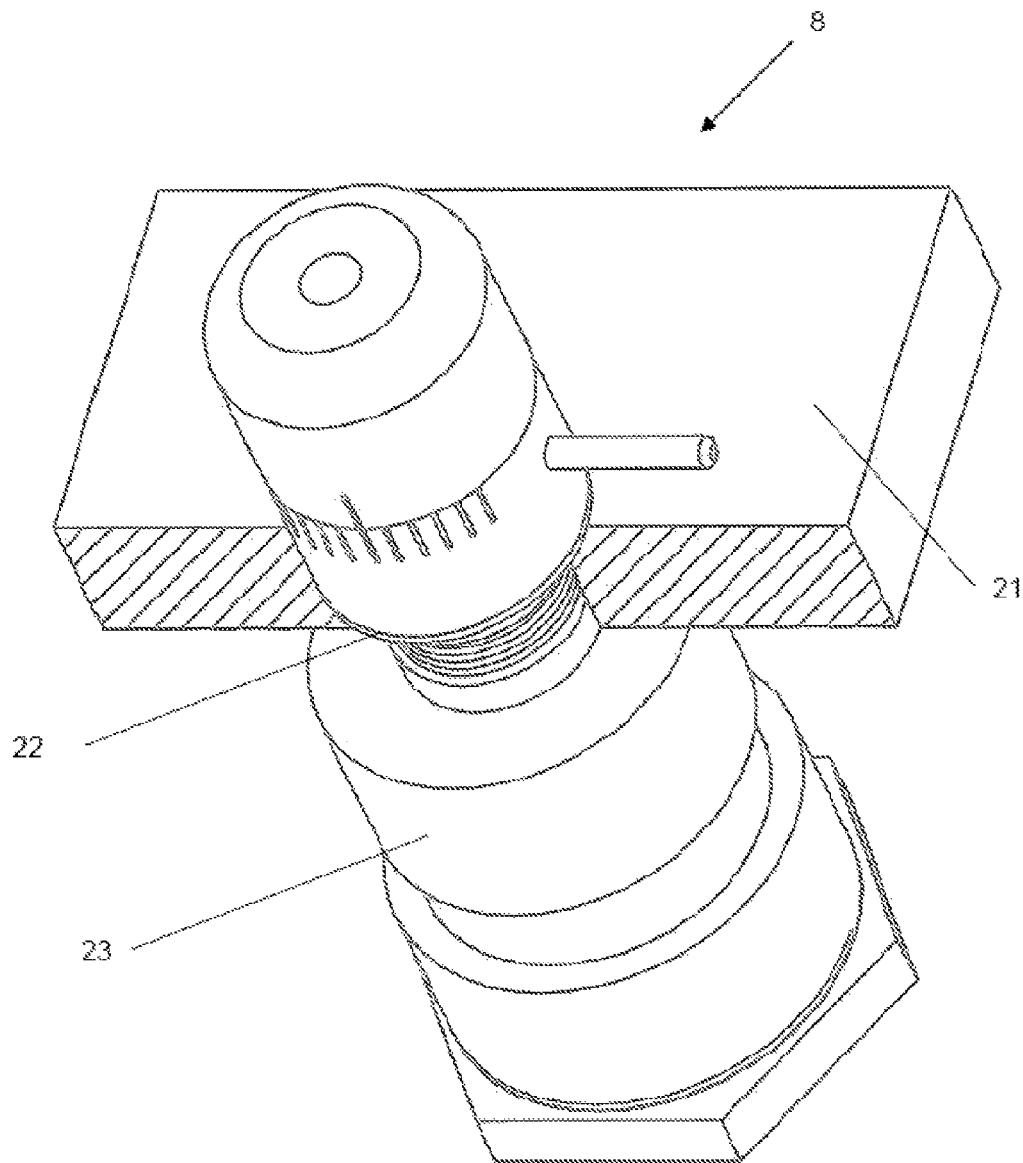
FIG. 17 is a perspective view of a third embodiment of a fluid control device with a temperature control function according to the present invention.
Figure 23:
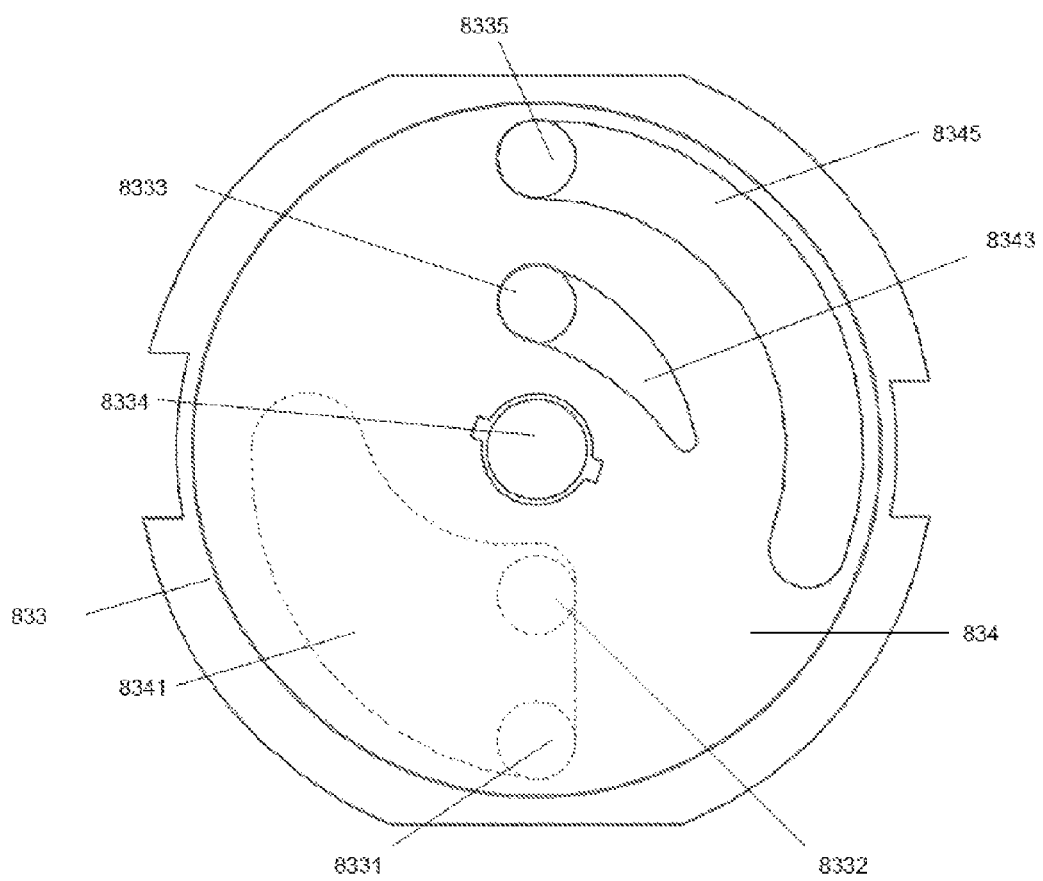
FIG. 23 is a schematic view of a state change of rotation of the moveable plate in the flow regulating valve shown in FIG. 18 relative to a fixed plate, illustrating that the flow regulating valve is in an on state.
Figure 24:
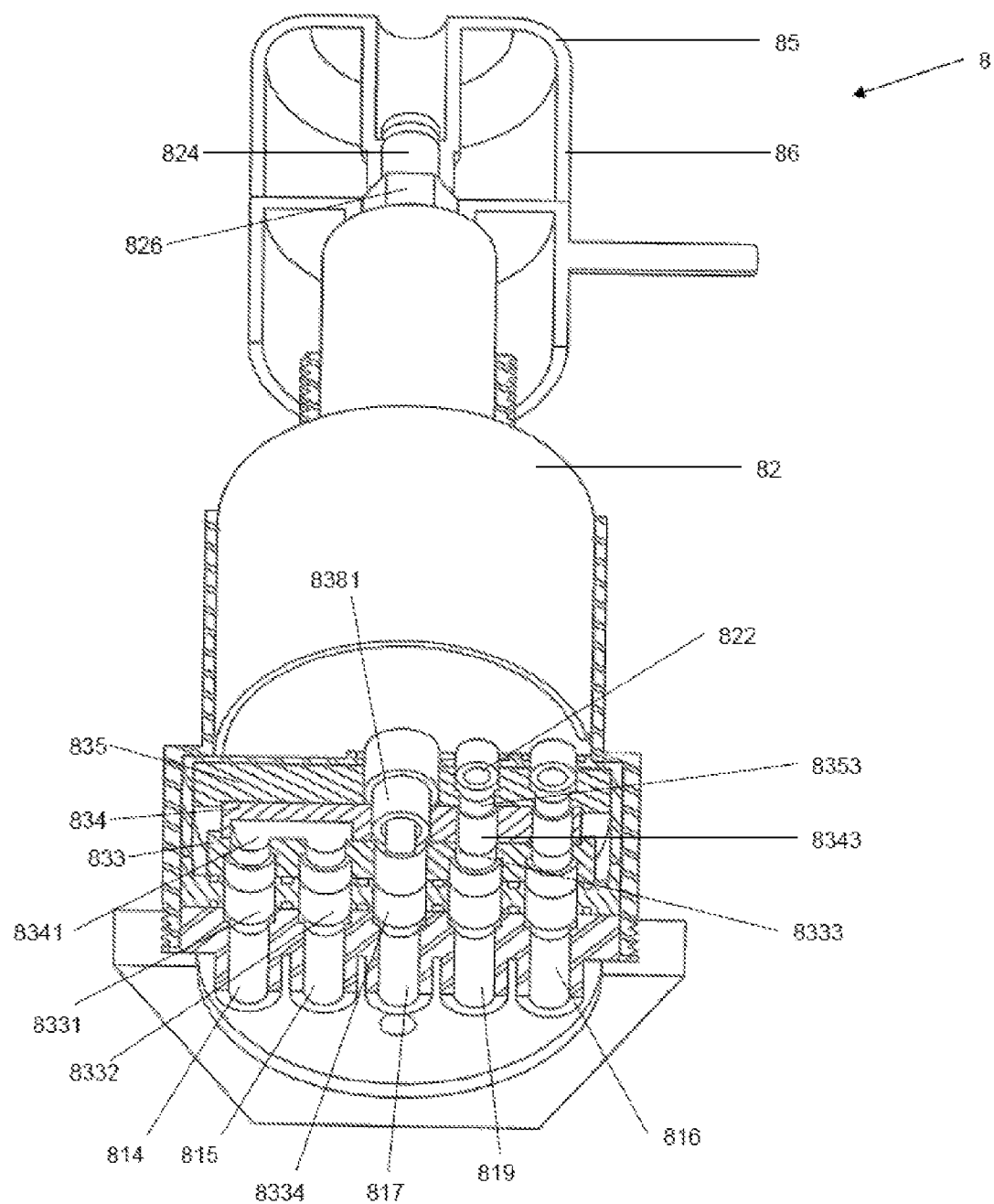
FIG. 24 is a sectional perspective view of the fluid control device with a temperature control function shown in FIG. 17.
Figure 25:
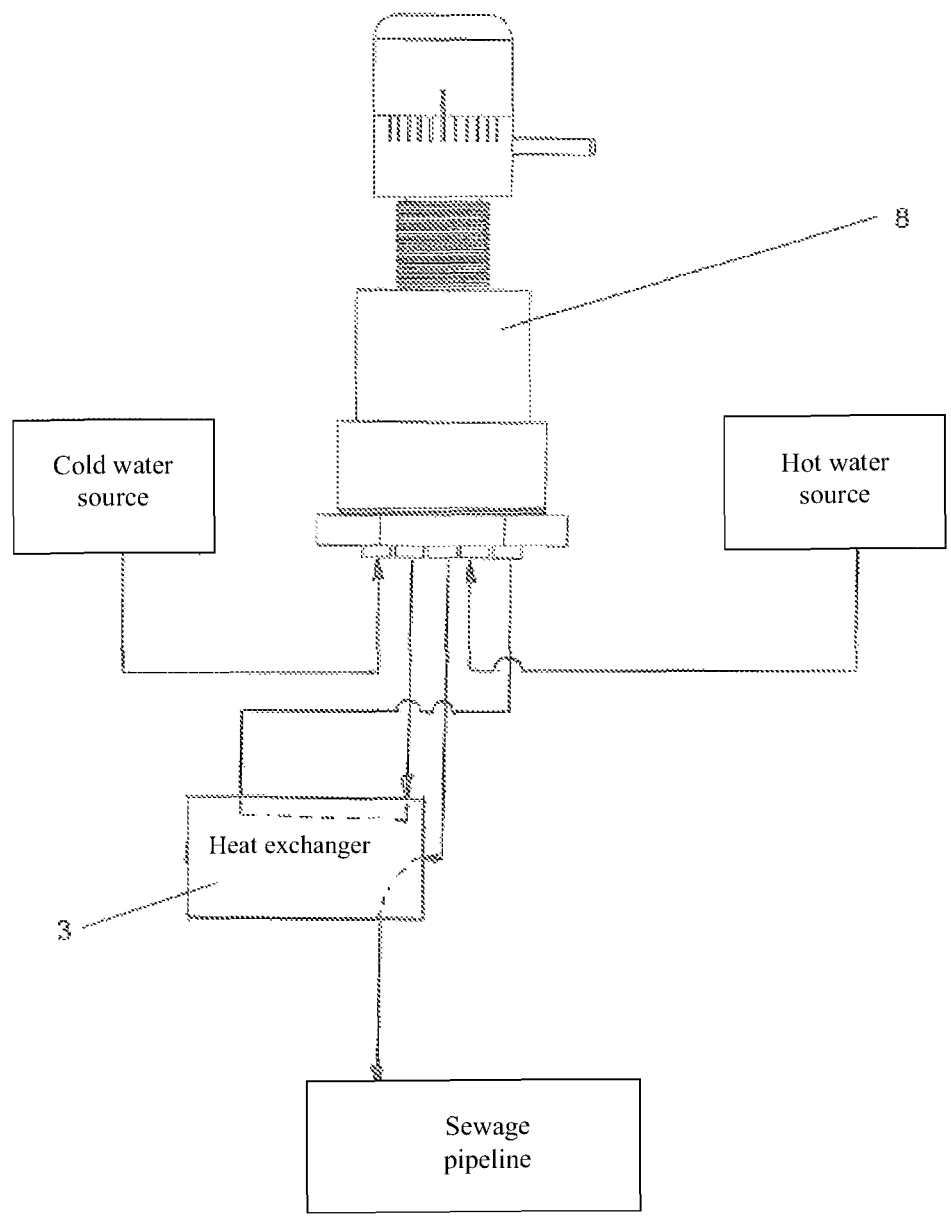
FIG. 25 is a structural block diagram of a heat energy recovery device including the fluid control device with a temperature control function shown in FIG. 17.

FIG. 17 to FIG. 24 illustrate a structure of a third embodiment of a valve assembly with a thermostatic function according to the present invention, and FIG. 25 is a structural block diagram of a heat energy recovery device including the valve assembly with a thermostatic function according to the present invention. As shown in FIG. 17, the valve assembly 8 is fastened onto a table surface 21 by means of fasteners 22 and 23.

Figure 18:
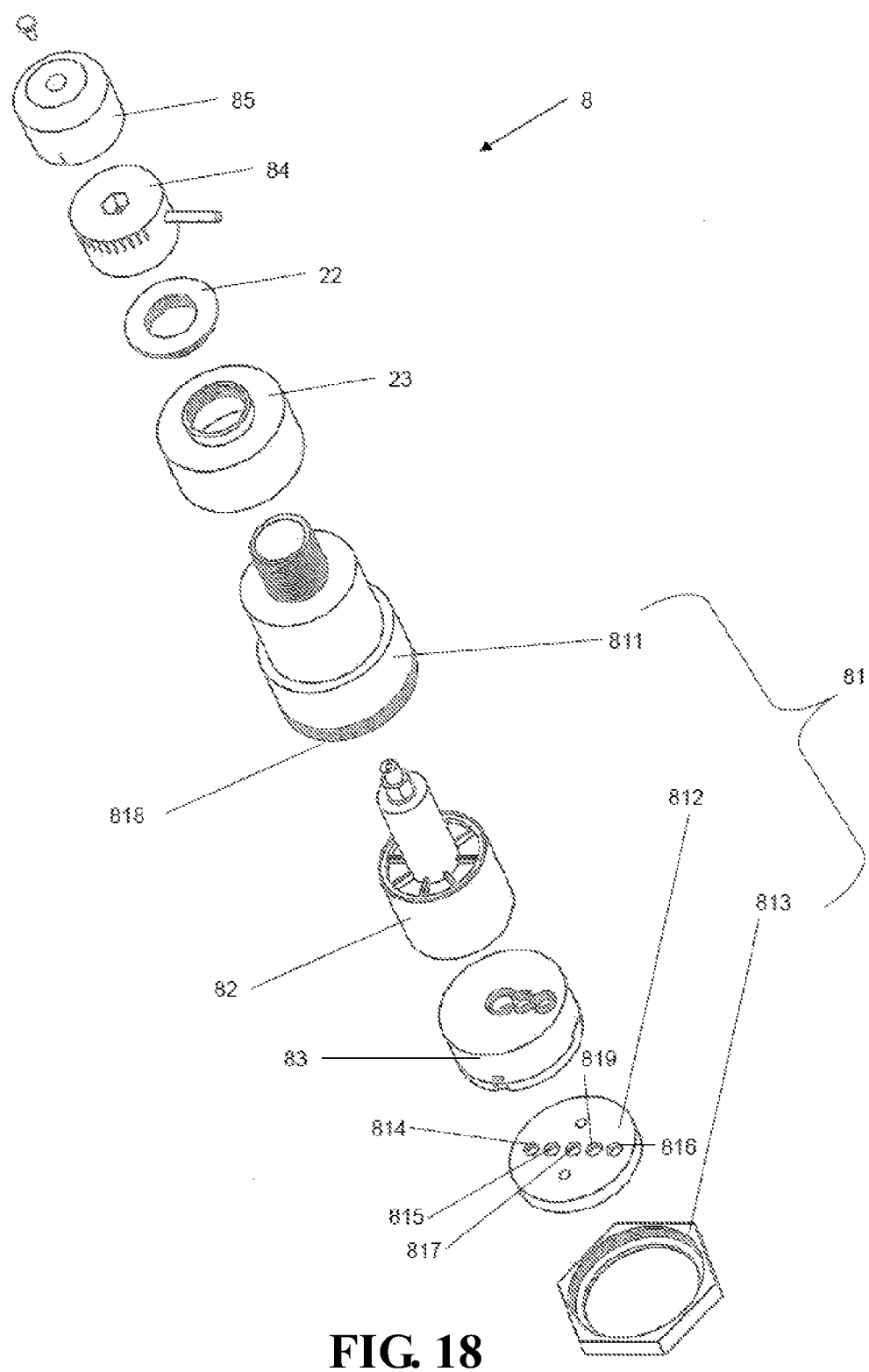
FIG. 18 is an exploded perspective view of the fluid control device with a temperature control function shown in FIG. 17.

As shown in FIG. 17 and FIG. 18, the valve assembly 8 includes a housing 81 which consists of a top shell 811, a bottom shell 812, and a screw cap 813, which form a cavity 818 therein, where the cavity 818 is in communication with a cold water inlet 814, a cold water outlet 815, a hot water inlet 819, a tepid water inlet 816, and a tepid water outlet 817 on the bottom cover 812. The valve assembly 8 further includes a thermostat 82 disposed within the cavity 818, a flow regulating valve 83, a flow regulating knob 85, and a water-temperature regulating knob 84. The water-temperature regulating knob 84 and the flow regulating knob 85 are located on the same end of the housing 81.

Figure 19:
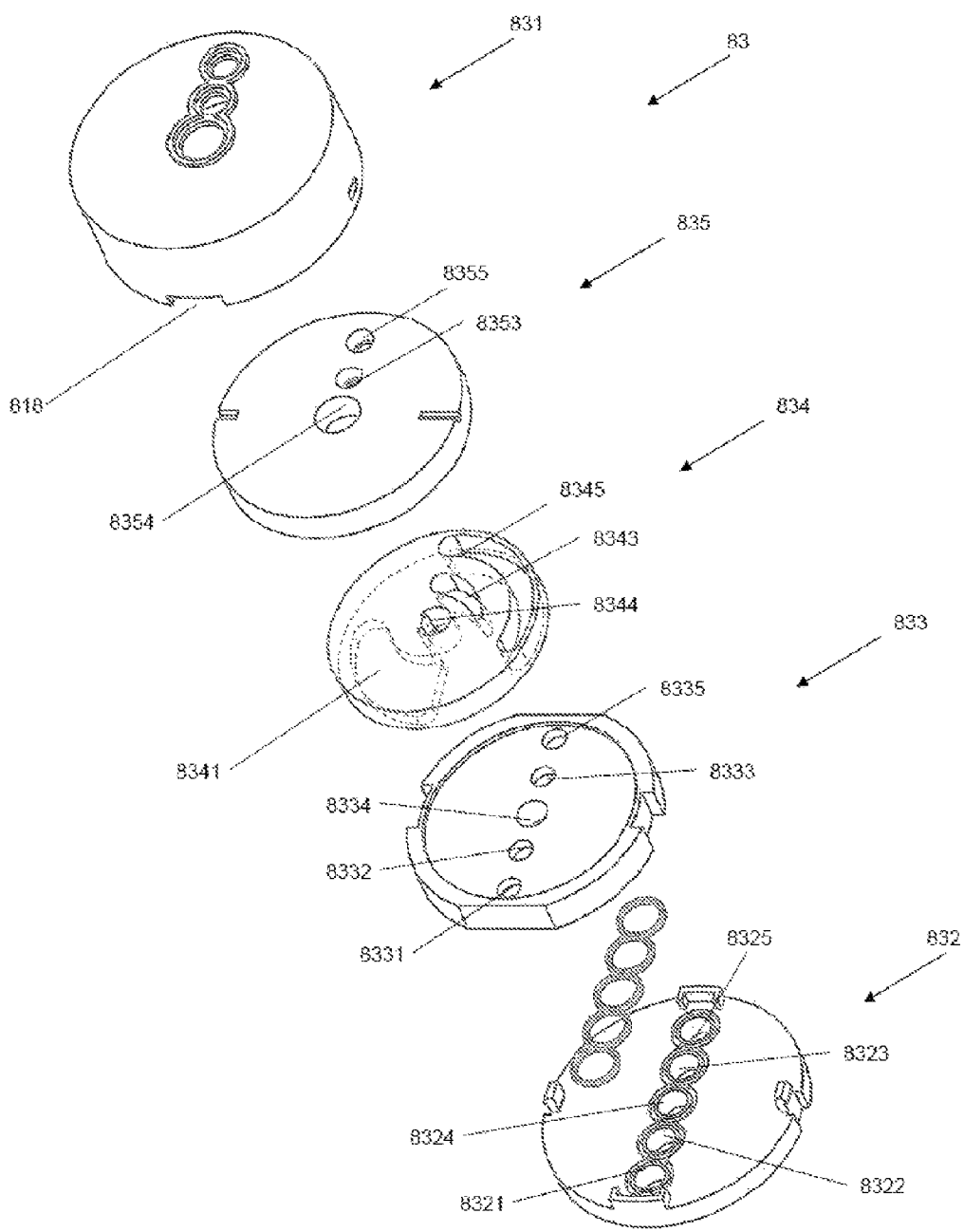
FIG. 19 is an exploded perspective view of a flow regulating valve in the fluid control device with a temperature control function shown in FIG. 18.

FIG. 19 is an exploded perspective view of the flow regulating valve 83. The flow regulating valve 83 includes a housing 831 with a cavity formed therein, a bottom cover 832 sealingly engaged to the housing 831, a first fixed plate 833 and a second fixed plate 835 fixedly disposed in the cavity 818 of the housing 831, and a rotatable plate 834 relatively rotatably disposed between the first fixed plate 833 and the second fixed plate 835. In particular, a contact surface between the first fixed plate 833 and the rotatable plate 834, and a contact surface between the second fixed plate 835 and the rotatable plate 834 are planes. The bottom cover 832 is provided with a cold water inlet 8321, a cold water outlet 8322, a tepid water inlet 8323, a hot water inlet 8325, and a tepid water outlet 8324, which are in communication with the cold water inlet 814, the cold water outlet 815, the hot water inlet 819, the tepid water inlet 816, and the tepid water outlet 817 of the housing 81 respectively.

In addition to the cold water inlet hole 8331 and a cold water outlet hole 8332 that are in communication with the cold water inlet 8321 and the cold water outlet 8322 respectively as provided on the bottom cover 832, the first fixed plate 833 is further provided with a hot water inlet hole 8333 that is in communication with the hot water inlet 8325 on the bottom cover 832, and a tepid water input hole 8335 and a tepid water output hole 8334 that are in communication with the tepid water inlet 8323 and the tepid water outlet 8324 respectively.

The second fixed plate 835 is provided with a hot water inlet hole 8353, a tepid water input hole 8355, and a tepid water output hole 8354 that are aligned with the hot water inlet hole 8333, the tepid water input hole 8335, and the tepid water output hole 8334 of the first fixed plate respectively.

In addition to a groove 8341 is provided to the rotatable plate 834, the rotatable plate 834 is further provided with a hot water hole 8343, a tepid water input hole 8345, and a tepid water output hole 8344, which are disposed to be as follows: rotatable plate not only the groove 8341 can communicate with the cold water inlet hole 8331 and the cold water outlet hole 8332 of the first fixed plate 833 in different degrees, the hot water hole 8343 also synchronously communicates with the hot water inlet hole 8333 of the first fixed plate 833 and the hot water inlet hole 8353 of the second fixed plate 835 in different degrees depending on the rotation of the rotatable plate 834.

Figure 20:
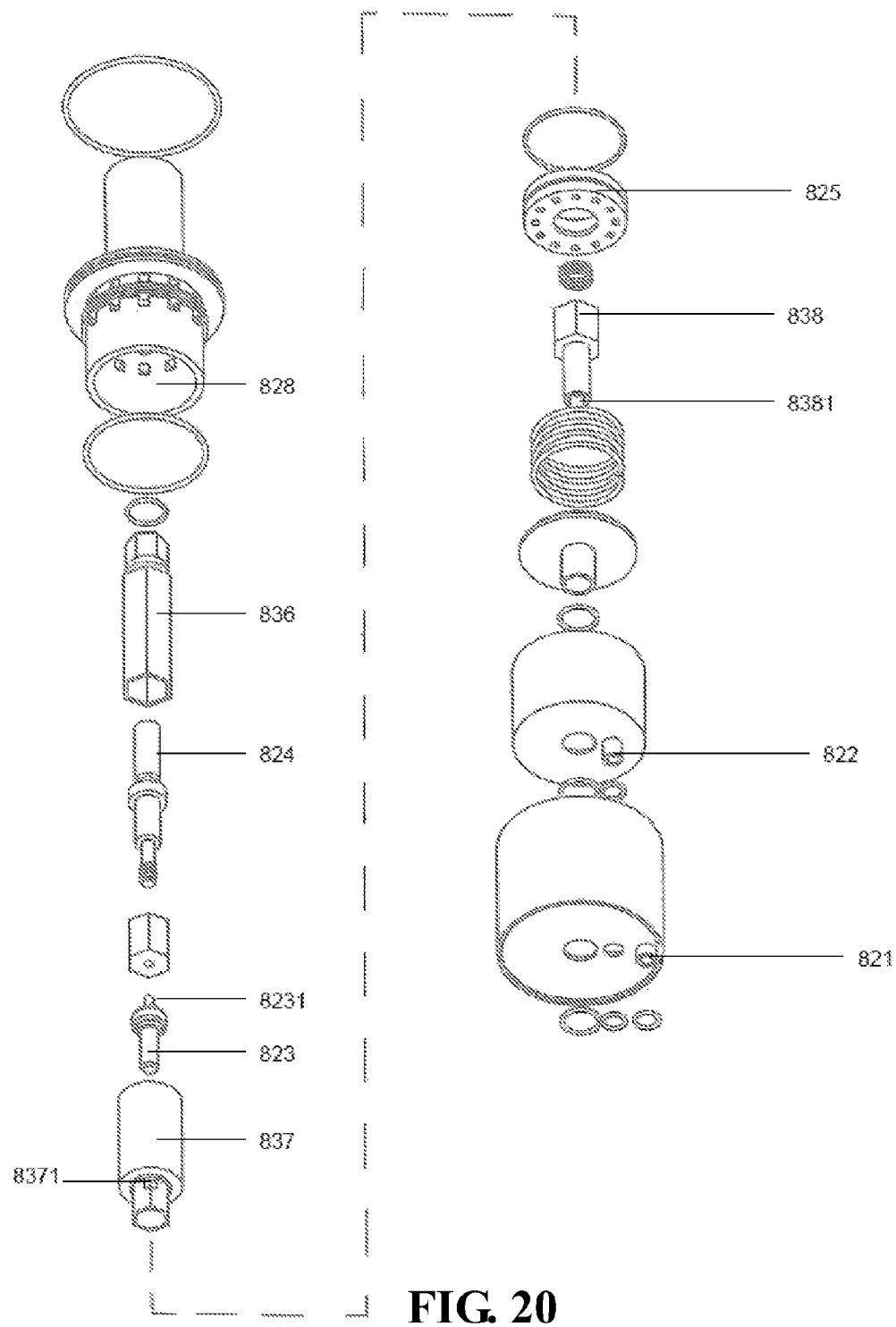
FIG. 20 is an exploded perspective view of a thermostat in the fluid control device with a temperature control function shown in FIG. 18.
Figure 21:
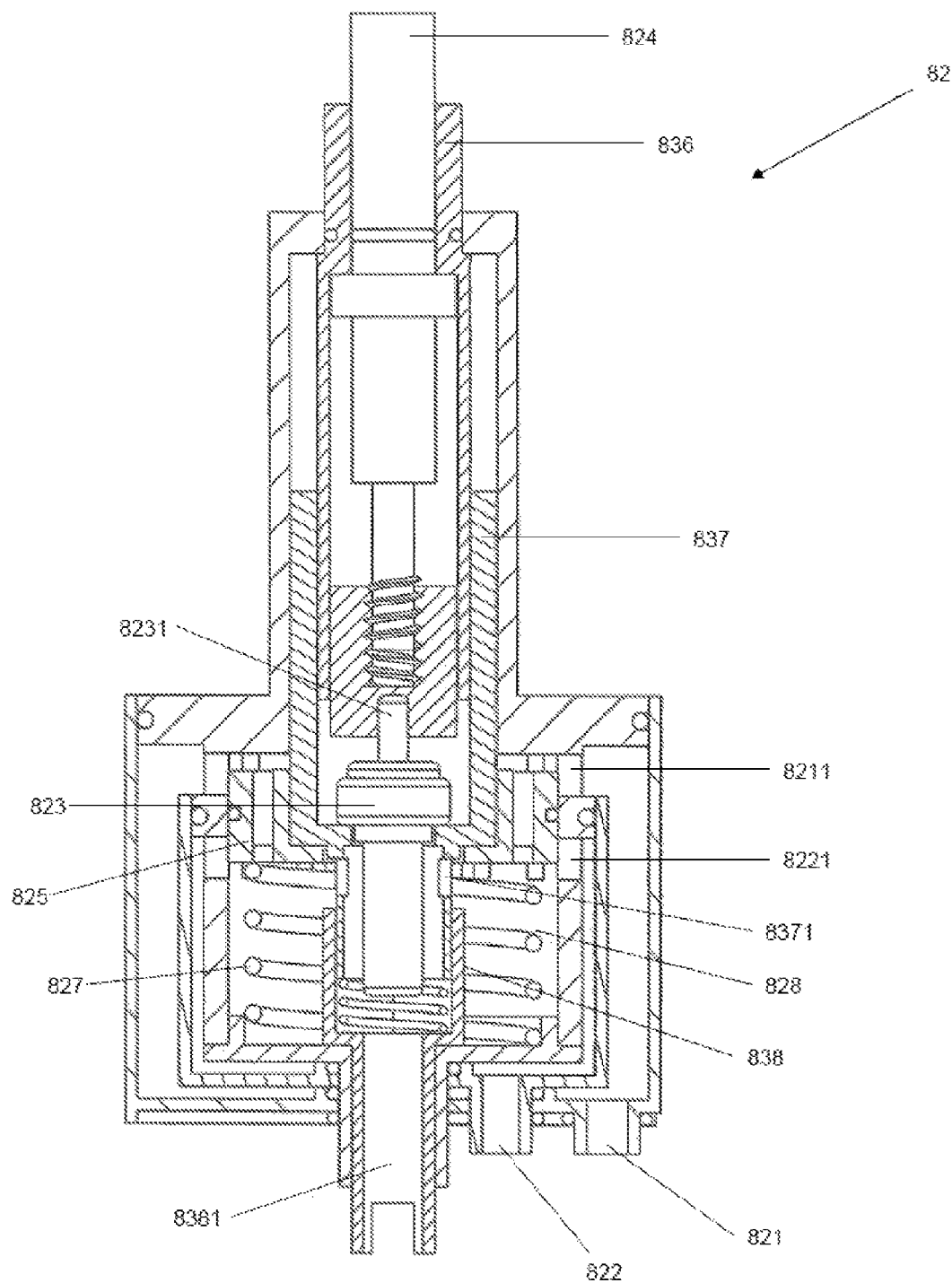
FIG. 21 is an assembling sectional view of the temperature control device shown in FIG. 20.

As shown in FIG. 20 to FIG. 21, the thermostat 82 has a tepid water inlet 821, a hot water inlet 822, and a mixing chamber 828. The mixing chamber 828 of the thermostat 82 is provided with a thermostatic element 823 and a slider 825 therein. Substance in the thermostatic element 823 can automatically change the length of a tail 8231 of the thermostatic element 823 based on the water temperature in the mixing chamber 828 according to the principle of thermal expansion and contraction. When the water temperature in the mixing chamber 828 is higher than a temperature preset by the water-temperature regulating knob 85 by means of a control rod 824, the tail 8231 of the thermostatic element 823 may lengthen to press the slider 825 downwards so as to narrow a hot water channel 8221 between the hot water inlet 822 and the mixing chamber 828 and widen a tepid water channel 8211 between the cold water inlet 821 and the mixing chamber 828 to increase the amount of tepid water in the mixing chamber 828 and decrease the amount of hot water, thereby lowering the water temperature in the mixing chamber 828. However, when the water temperature in the mixing chamber 828 is lower than the temperature preset by the water-temperature regulating knob 85 by means of the control rod 824, the tail 8231 of the thermostatic element 823 may shorten, a spring 827 may push the slider 825 upwards so as to widen the hot water channel 8221 and narrow the tepid water channel 8211, to increase the amount of hot water in the mixing chamber 828 and decrease the amount of tepid water, thereby raising the water temperature in the mixing chamber 828. The thermostat 82 is further internally provided with a flow regulating rod 836, which is connected to a connector 837 and a connector 838, to enable the connector 838 to synchronously rotate with the flow regulating knob 86. The flow regulating rod 836, the connector 837, and the connector 838 pass through the interior of the thermostat 82, and one end 8381 of the connector 838 protrudes from the thermostat 82, and is inserted into a tepid water output hole 8344 in the center of the rotatable plate 834 of the flow regulating valve 83 so as to drive the rotatable plate 834 to synchronously rotate with the flow regulating knob 86.

Figure 22:
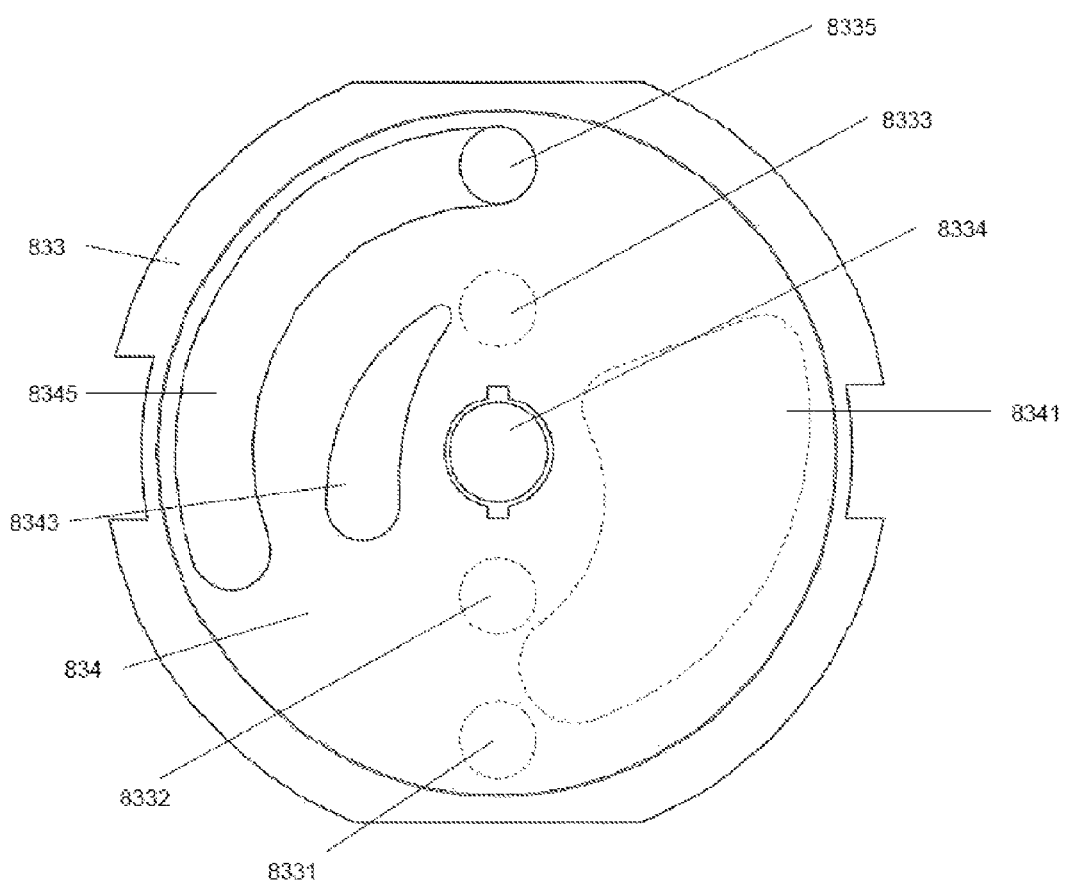
FIG. 22 is a schematic view of a state change of rotation of a moveable plate in the flow regulating valve shown in FIG. 18 relative to a fixed plate, illustrating that the flow regulating valve is in an off state.

FIG. 22 and FIG. 23 illustrate state changes generated by rotation of the rotatable plate 834 relative to the first fixed plate 833 and the second fixed plate 835. In an initial state shown in FIG. 22, that is, when the flow regulating valve 83 is in an off state, the groove 8341 of the rotatable plate 834 does not cover the cold water inlet 8331 and the cold water outlet 8332 of the first fixed plate 833, and the hot water hole 8343 of the rotatable plate 834 does not cover the hot water inlet hole 8333 of the first fixed plate 833, so that the cold water inlet hole 8331 and the cold water outlet hole 8332 are spaced apart from each other but are not in communication, and the hot water inlet hole 8333 of the first fixed plate 833 and the hot water inlet hole 8353 of the second fixed plate 835 are also spaced apart from each other but are not in communication.

When the flow regulating knob 85 is used to rotate the rotatable plate 834, the rotatable plate 834 gradually enters a full-on state as shown in FIG. 23. In this case, as shown in FIG. 23 to FIG. 25, the groove 8341 of the rotatable plate 834 completely covers the cold water inlet 8331 and the cold water outlet 8332, and the hot water hole 8343 of the rotatable plate 834 completely covers the hot water inlet hole 8333 of the first fixed plate 833, so as to be completely communicated with the hot water inlet hole 8353 of the second fixed plate 835. Cold water supplied by a cold water source enters the cold water outlet hole 8332 through the cold water inlet hole 8331 and the groove 8341, that is, the cold water is output to the cold water outlet 815 of the housing 81 through the cold water inlet 814 of the housing 81 to be supplied to a heat exchanger 3. The cold water exchanges heat with hot wastewater from an application device (for example, a washing facility) in the heat exchanger 3, so that the cold water becomes tepid water and is then communicated with the tepid water inlet 816 of the housing 81; meanwhile, hot water supplied by a hot water source is communicated with the hot water inlet 822 of the thermostat 82 through the hot water inlet aperture 819, and the hot water inlet holes 8333, 8343 and 8353 of the first fixed plate 833, the rotatable plate 834 and the second fixed plate 835. The tepid water and the hot water enter an hole 8371 of the connector 837 and a central hole 8381 of the connector 838 through the cavity 828 by means of the thermostat 82, and then provide hot water with a stable water temperature at the temperature preset by the temperature regulating knob 86 by means of the control rod 824 for the tepid water outlet 817 of the housing 81 through tepid water output holes 8354, 8344 and 8334 in the center of the second fixed plate 835, the rotatable plate 834 and the first fixed plate 833 so as to be supplied to the application device.

The working principle of the heat energy recycle device of FIG. 25 is substantially similar to that of the heat energy recycle device shown in FIG. 10 and thus omitted herein.

In the above examples, the rotatable plates 56, 76 and 834 regulate the fluid flow passing through the fluid control device of the present invention by means of rotation. It should be understood by one skilled in the art that this could be achieved by other means of movement such as linear movement etc to regulate the fluid flow control. Such variations fall within the spirit and scope of the present invention.

Although various embodiments of the present invention have been described above in detail, variations and improvements to the present invention may be further made by a person skilled in the art. It should be understood that such variations and improvements shall fall within the spirit and scope of the present invention. It should be noted that although the aforementioned embodiments have exemplified with water as an example of fluids to illustrate the structure and operation of the present invention, one person skilled in the art should appreciate that the embodiments of the present invention is not limited to the usage of water, but also fit for all other suitable fluids.

The invention claimed is:

1. A fluid control device, comprising:
   a housing including a first inlet for receiving a fluid having a first temperature, a second inlet for receiving a fluid having a second temperature, a first outlet through which a fluid of a third temperature flows, a third inlet and a second outlet for receiving and discharging a fluid of a fourth temperature;
   a fluid temperature control assembly disposed in the housing, and including a mixing cavity defined therein, wherein the fluid temperature control assembly comprises:
      a first group of one or more apertures of the mixing cavity configured for regulating fluid communication between the mixing cavity and the first inlet of the housing;
      a second group of one or more apertures of the mixing cavity for regulating fluid communication between the second inlet of the housing and the mixing cavity;
      a third group of one or more apertures of the mixing cavity in fluid communication with the first outlet;
      a sensor for detecting the temperature of the mixed fluid within the mixing cavity and modifying properties of the at least one of the first group of apertures or at least one of the second group of apertures of the fluid temperature control assembly according to the detected temperature of the mixed fluid within the mixing cavity;
   a flow regulating valve disposed within the housing, the flow regulating valve comprising:
      a first plate having a first hole and a second hole therethrough, the first and second holes being spaced apart from each other,
      a second plate moveable relative to the first plate and including a first slot formed therein,
   wherein changing the alignment of the first slot of the second plate relative to the holes of the first plate regulates the amount of fluid flow through a passageway from the third inlet to the second outlet;
   wherein the fluid temperature control assembly modifies properties of at least one of the first group of apertures or at least one of the second group of apertures for regulating the amount of fluid having a first temperature relative to the amount of fluid having a second temperature received within the mixing cavity, thereby maintaining the fluid discharged from the first outlet at a predetermined temperature.

2. The fluid control device according to claim 1, wherein the first plate further includes at least a further hole in fluid communication with the first inlet and a fourth hole in fluid communication with at least one of the first group of apertures of the fluid temperature control assembly;
   the second plate further includes a second slot, wherein by changing the alignment of the first and second slots of the second plate relative to the holes of the first plate controls the fluid communication between the third inlet and the second outlet and the fluid communication between the first inlet and at least one of the first group of apertures of the fluid temperature control assembly.

3. The fluid control device according to claim 1, wherein the flow regulating valve further includes a third plate, arranged such that the second plate is disposed between the first plate and the third plate,
   wherein each of the first plate, second plate and third plate further includes at least a further hole therein, and said at least one further hole of the third plate and the fluid temperature control assembly being in fluid communication; and
   the second plate is configured such that movement of the second plate relative to the first and third plates and the first slot and at least one further hole therein simultaneously regulates flow between the third inlet and the second outlet and flow between the first inlet and fluid temperature control assembly.

4. The fluid control device according to claim 3, further including:
a flow regulating knob disposed on the housing for adjusting via a connecting rod the flow regulating valve so as to modify the alignment of the first slot of the second plate relative to the holes of the first plate and the third plate;
a temperature regulating knob disposed on the housing, for regulating the predetermined temperature of the mixed fluid within the mixing cavity by adjusting the temperature regulating knob or a connecting rod thereof.

5. The fluid control device according to claim 4, wherein the flow regulating knob or the connecting rod thereof are coaxially rotated with the temperature regulating knob or the connecting rod thereof.

6. The fluid control device according to claim 3, wherein the at least one of third group of apertures of the mixing cavity of the fluid temperature control assembly is connected to the first outlet of the housing via one of the first plate, the second plate and the third plate.

7. The fluid control device according to claim 3, wherein the second inlet of the housing is connected to at least one of the second group of apertures of the fluid temperature control assembly through at least one of the first plate, second plate and third plate.

8. The fluid control device according to claim 1, further including:
a flow regulating knob disposed on the housing for adjusting via a connecting rod a flow regulating valve so as to modify the alignment of the second plate relative to the holes of the other plates;
wherein the connector of the second plate and the flow regulating knob extend through the interior of the fluid temperature control assembly.

9. The fluid control device according to claim 1, further including:
a heat exchanger thermally isolated from the housing;
a fluid passageway for conveying fluid with a fourth temperature from the second outlet of the housing to the heat exchanger;
wherein the fluid of fourth temperature undergoes heat exchange with the mixed fluid with third temperature from the first outlet within the heat exchanger, such that the temperature of the fluid with fourth temperature approaches the second temperature,
wherein at least a portion of the fluid with a second temperature after heat exchange is conveyed via the second inlet.

10. The fluid control device according to claim 9, further including a heater, wherein at least a portion of the fluid having a second temperature following heat exchange is conveyed to the heater for heating to a first temperature and re-introduction into the first inlet.

11. The fluid control device according to claim 1, further including:
a flow regulating knob disposed on the housing for adjusting via a connecting rod the flow regulating valve so as to modify the alignment of the first slot of the second plate relative to the holes of the first plate;
a temperature regulating knob disposed on the housing, for regulating the predetermined temperature of the mixed fluid within the mixing cavity by adjusting the temperature regulating knob or a connecting rod thereof.

12. The fluid control device according to claim 1, wherein at least one of the third group of apertures of the mixing cavity of the fluid temperature control assembly is connected to the first outlet of the housing via one of the first plate and second plate.

13. The fluid control device according to claim 1, wherein the second inlet of the housing is connected to at least one of the second group of apertures of the fluid temperature control assembly through at least one of the first plate and second plate.

* * * * *